US012695161B2

(12) United States Patent     (10) Patent No.:   US 12,695,161 B2

Wu et al.     (45) Date of Patent:     Jul. 28, 2026

(54) BATTERY CELL, BATTERY, AND ELECTRIC APPARATUS

(71) Applicant: CONTEMPORARY AMPEREX TECHNOLOGY CO., LIMITED, Ningde (CN)

(72) Inventors: Kai Wu, Ningde (CN); Mingguang Gu, Ningde (CN); Xiaobo Chen, Ningde (CN); Yao Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/325,522

(22) Filed: Sep. 11, 2025

(65) Prior Publication Data

US 2026/0011879 A1     Jan. 8, 2026

Related U.S. Application Data

(63) Continuation of application No. PCT/CN2023/117562, filed on Sep. 7, 2023.

(30) Foreign Application Priority Data

Jul. 18, 2023   (CN) .......................... 202310878768.8

(51) Int. Cl.
    *H01M 50/533*     (2021.01)
    *B60L 50/60*     (2019.01)
    (Continued)

(52) U.S. Cl.
    CPC ....... *H01M 50/533* (2021.01); *H01M 50/103* (2021.01); *H01M 50/15* (2021.01);
    (Continued)

(58) Field of Classification Search
None
See application file for complete search history.

(56) References Cited

U.S. PATENT DOCUMENTS

| | | | |
|---|---|---|---|
| 5,080,985 A | 1/1992 | Wiacek et al. | |
| 6,472,097 B1 * | 10/2002 | Ohbayashi | ........ H01M 50/3425 |
| | | | 429/61 |

(Continued)

FOREIGN PATENT DOCUMENTS

| | | |
|---|---|---|
| CN | 103187241 A | 7/2013 |
| CN | 111293348 A | 6/2020 |

(Continued)

OTHER PUBLICATIONS

International Search Report in the international application No. PCT/CN2023/117562, dated Nov. 15, 2023, 7 pages with English translation.

(Continued)

*Primary Examiner* — Scott J. Chmielecki

(74) *Attorney, Agent, or Firm* — K&L Gates LLP

(57) ABSTRACT

A battery cell, a battery, and an electric apparatus are provided. The battery cell includes a housing and a first conductive layer. The housing includes a first wall portion, where the first wall portion has a first surface, the first wall portion is provided with a recess, and the recess has a side surface connected to the first surface. The first conductive layer is accommodated in the recess, and the first conductive layer is in contact with the side surface. The provision of the first conductive layer improves the electric field distribution in a region, provided with the recess, of the first wall portion, resulting in a more uniform electric field strength distribution, reducing the risk of tip discharge at a connection (Continued)

position between the side surface and the first surface in a high-voltage environment, and improving the reliability of the battery cell.

19 Claims, 11 Drawing Sheets

(51) Int. Cl.

| | |
|---|---|
| *B60R 16/033* | (2006.01) |
| *H01M 50/103* | (2021.01) |
| *H01M 50/15* | (2021.01) |
| *H01M 50/342* | (2021.01) |

(52) U.S. Cl.
CPC ......... *H01M 50/3425* (2021.01); *B60L 50/60* (2019.02); *B60R 16/033* (2013.01); *H01M 2200/20* (2013.01); *H01M 2220/20* (2013.01)

(56) References Cited

U.S. PATENT DOCUMENTS

| | | | | |
|---|---|---|---|---|
| 2004/0170891 A1* | 9/2004 | Kajiya | ............... | H01M 50/529 |
| | | | | 429/185 |
| 2014/0072841 A1 | 3/2014 | Yamada et al. | | |
| 2014/0113184 A1* | 4/2014 | Hamel | ............... | H01M 50/178 |
| | | | | 429/163 |
| 2016/0043353 A1* | 2/2016 | Tsutsumi | ............... | C22C 21/06 |
| | | | | 429/163 |
| 2017/0018758 A1* | 1/2017 | Sawada | ............... | H01M 50/553 |
| 2019/0181408 A1 | 6/2019 | Jang et al. | | |
| 2019/0270165 A1 | 9/2019 | Takada et al. | | |
| 2022/0320679 A1* | 10/2022 | Li | ...................... | H01M 50/375 |
| 2023/0136818 A1 | 5/2023 | Kim et al. | | |
| 2023/0207954 A1* | 6/2023 | Sun | ...................... | H01M 50/209 |
| | | | | 429/56 |
| 2024/0106042 A1* | 3/2024 | Wu | ...................... | H01M 50/107 |
| 2024/0162536 A1* | 5/2024 | He | ...................... | H01M 50/188 |

FOREIGN PATENT DOCUMENTS

| | | | | | |
|---|---|---|---|---|---|
| CN | 215989101 U | | 3/2022 | | |
| CN | 216085200 U | | 3/2022 | | |
| CN | 217009338 U | | 7/2022 | | |
| CN | 111615758 B | * | 11/2022 | .......... | H01M 10/615 |
| CN | 217719870 U | | 11/2022 | | |
| CN | 115322721 B | | 1/2023 | | |
| CN | 115555222 A | | 1/2023 | | |
| CN | 115663389 A | | 1/2023 | | |
| CN | 116598727 A | * | 8/2023 | ............ | H01M 50/15 |
| EP | 4203160 A1 | | 6/2023 | | |
| EP | 4307441 A1 | | 1/2024 | | |
| KR | 1020140050874 A | | 4/2014 | | |
| WO | 2023097469 A1 | | 6/2023 | | |

OTHER PUBLICATIONS

ISA Written Opinion in the international application No. PCT/CN2023/117562, dated Nov. 15, 2023, 8 pages with English translation.

The first office action received in the counterpart CN application 202310878768.8, dated Aug. 22, 2023, 28 pages with English translation.

The Grant Notice received in the counterpart CN application 202310878768.8, dated Sep. 26, 2023, 8 pages with English translation.

The extended European search report in the EP Application No. 23945562.9, dated Jun. 8, 2026, 14 pages.

\* cited by examiner

BATTERY CELL, BATTERY, AND ELECTRIC APPARATUS

CROSS-REFERENCE TO RELATED APPLICATIONS

This application is a continuation of International Application No. PCT/CN2023/117562, filed Sep. 7, 2023, which claims priority to Chinese Patent Application 2023108787688, filed on Jul. 18, 2023 and entitled "BATTERY CELL, BATTERY, AND ELECTRIC APPARATUS", which is incorporated herein by reference in its entirety.

TECHNICAL FIELD

This application relates to the field of battery technology, and specifically, to a battery cell, a battery, and an electric apparatus.

BACKGROUND

With the development of new energy technology, batteries are increasingly widely used, for example, in mobile phones, notebook computers, electric bicycles, electric vehicles, electric airplanes, electric ships, electric toy cars, electric toy ships, electric toy airplanes, electric tools, and the like.

In the development of battery technology, in addition to improving the performance of battery cells, the reliability of battery cells is also a factor that needs to be considered. Therefore, how to improve the reliability of battery cells is an urgent issue to be addressed in battery technology.

SUMMARY

Embodiments of this application provide a battery cell, a battery, and an electric apparatus, capable of effectively improving the reliability of the battery cell.

According to a first aspect, an embodiment of this application provides a battery cell including a housing and a first conductive layer. The housing includes a first wall portion, where the first wall portion has a first surface, the first wall portion is provided with a recess, and the recess has a side surface connected to the first surface; and the first conductive layer is accommodated in the recess, and the first conductive layer is in contact with the side surface.

In the above technical solution, the recess is internally provided with the first conductive layer in contact with the side surface. The provision of the first conductive layer improves the electric field distribution in a region, provided with the recess, of the first wall portion, resulting in a more uniform electric field strength distribution, reducing the risk of tip discharge at a connection position between the side surface and the first surface in a high-voltage environment, and improving the reliability of the battery cell.

In some embodiments, the first conductive layer extends from the first surface into the recess. This ensures that the first conductive layer is not entirely below the first surface, which is conducive to eliminating a discharge tip at the connection position between the side surface and the first surface, further reducing the risk of tip discharge at the connection position between the side surface and the first surface in the high-voltage environment.

In some embodiments, the recess has a bottom surface facing the first conductive layer, and the bottom surface is connected to the side surface; and the first conductive layer is in contact with the bottom surface. This can reduce the risk of tip discharge at a connection position between the bottom surface and the side surface in a high-voltage environment, further improving the reliability of the battery cell.

In some embodiments, the first conductive layer fills the recess. This is conducive to eliminating as many discharge tips as possible in the region, provided with the recess, of the first wall portion.

In some embodiments, the recess has a bottom surface facing the first conductive layer, and the bottom surface is connected to the side surface; and the first conductive layer is spaced apart from the first surface. This can reduce materials used for the first conductive layer, thereby saving costs.

In some embodiments, a maximum thickness of the first conductive layer is denoted as $H_1$, and a maximum depth of the recess is denoted as $H_2$, satisfying: $0.1 \leq H_1/H_2 \leq 1$. This ensures that the thickness of the first conductive layer is not too small, and the first conductive layer is less likely to fail due to the too small thickness, which is conducive to eliminating the discharge tip at the connection position between the side surface and the first surface.

In some embodiments, $0.4 \leq H_1/H_2 \leq 1$. This further increases the thickness of the first conductive layer, is conducive to eliminating the discharge tip at the connection position between the side surface and the first surface, and is also conducive to increasing a contact area between the first conductive layer and the first wall portion.

In some embodiments, the first conductive layer has a second surface farthest from the bottom surface of the recess, and the second surface of the first conductive layer is flush with the first surface. This makes the second surface coplanar with the first surface, resulting in a flatter region, provided with the recess, of the first wall portion, with a more uniform electric field strength distribution in this region.

In some embodiments, the first conductive layer is a conductive adhesive layer bonded to the first wall portion. This ensures that the first conductive layer has a high connection strength with the first wall portion, making it less likely for the first conductive layer to detach from the recess. During formation, applying a conductive adhesive into the recess can correspondingly form the first conductive layer, making the formation of the first conductive layer convenient.

In some embodiments, the battery cell further includes a second conductive layer, the second conductive layer has a third surface, the third surface is in contact with the first surface, the first conductive layer extends from the third surface into the recess, and the second conductive layer covers the recess. This can conceal the recess, improving aesthetics. Additionally, the third surface of the second conductive layer being in contact with the first surface and the first conductive layer being in contact with the side surface are conducive to eliminating the discharge tip at the connection position between the side surface and the first surface.

In some embodiments, the second conductive layer covers the first surface. This reduces the risk of forming a discharge tip between an outer peripheral surface of the second conductive layer and the first surface.

In some embodiments, a surface of the second conductive layer facing away from the first surface is a plane. This reduces the risk of forming a discharge tip due to unevenness of the surface of the second conductive layer facing away from the first surface.

In some embodiments, a maximum thickness of the first conductive layer is denoted as $H_1$, a maximum depth of the recess is denoted as $H_2$, and a maximum thickness of the second conductive layer is denoted as $H_3$, satisfying: $0.1 \leq (H_1+H_3)/H_2 \leq 20$. $(H_1+H_3)/H_2 \geq 0.1$ ensures that the total thickness of the first conductive layer and the second conductive layer is not too small, allowing the first conductive layer and the second conductive layer to have sufficient structural strength. $(H_1+H_3)/H_2 \leq 20$ ensures that the total thickness of the first conductive layer and the second conductive layer is not too large, reducing materials used and production costs.

In some embodiments, $1 \leq (H_1+H_3)/H_2 \leq 5$.

In some embodiments, the first conductive layer and the second conductive layer are integrally formed. The first conductive layer and the second conductive layer being an entirety have good structural strength, reducing the difficulty of forming the first conductive layer and the second conductive layer.

In some embodiments, the second conductive layer is a conductive adhesive layer bonded to the first wall portion. This ensures that the second conductive layer has a high connection strength with the first wall portion, making it less likely for the second conductive layer to detach from the first surface. During formation, applying a conductive adhesive to the first surface can correspondingly form the second conductive layer, making the formation of the second conductive layer convenient.

In some embodiments, a conductivity of the first wall portion is denoted as $Q_1$, and a conductivity of the first conductive layer is denoted as $Q_2$, satisfying: $0.5 \leq Q_2/Q_1 \leq 1.5$. This ensures that the conductivity of the first conductive layer is not significantly different from the conductivity of the first wall portion, making the conductive performance of the first conductive layer and the first wall portion relatively similar, which is conducive to eliminating the discharge tip at the connection position between the side surface and the first surface.

In some embodiments, along a thickness direction of the first wall portion, the first surface faces an interior of the housing, or the first surface faces an exterior of the housing. If the first surface faces the interior of the housing, the recess is located on an inner side of the first wall portion, the first conductive layer is not exposed to the exterior of the housing, the housing provides protection to the first conductive layer, and the first conductive layer is less likely to be damaged. If the first surface faces the exterior of the housing, the recess is located on an outer side of the first wall portion, facilitating the placement of the first conductive layer in the recess.

In some embodiments, the recess is a groove provided on the first surface, and a side surface of the groove is the side surface. The provision of the first conductive layer is conducive to eliminating a discharge tip at a connection position between the side surface of the groove and the first surface.

In some embodiments, the first wall portion forms a weakened portion in a region provided with the groove, and the weakened portion is configured to be capable of rupturing to release internal pressure of the battery cell. This enables the first wall portion to have a pressure relief function, allowing the weakened portion to rupture during thermal runaway of the battery cell to release internal pressure of the battery cell.

In some embodiments, the side surface of the groove includes a first side surface and a second side surface opposite each other, and both the first side surface and the second side surface are in contact with the first conductive layer. This is conducive to eliminating a discharge tip at a connection position between the first side surface and the first surface and a discharge tip at a connection position between the second side surface and the first surface.

In some embodiments, the groove includes a first groove segment and a second groove segment, the second groove segment is connected to the first groove segment, and an extension direction of the second groove segment intersects an extension direction of the first groove segment; and the first conductive layer includes a first conductive portion and a second conductive portion, the first conductive portion is located in the first groove segment and is in contact with a side surface of the first groove segment, and the second conductive portion is located in the second groove segment and is in contact with a side surface of the second groove segment. Since the second groove segment is connected to the first groove segment and their extension directions intersect, the first wall portion can partially flip open after the weakened portion ruptures along the first groove segment and the second groove segment, effectively increasing a pressure relief area of the first wall portion and improving the timeliness of pressure relief during thermal runaway of the battery cell. The first conductive portion of the first conductive layer being located in the first groove segment and being in contact with the side surface of the first groove segment is conducive to eliminating a discharge tip at a connection position between the side surface of the first groove segment and the first surface. The second conductive portion of the first conductive layer being located in the second groove segment and being in contact with the side surface of the second groove segment is conducive to eliminating a discharge tip at a connection position between the side surface of the second groove segment and the first surface.

In some embodiments, along a width direction of the first groove segment, the side surface of the first groove segment includes a first side surface and a second side surface opposite each other, and both the first side surface and the second side surface are in contact with the first conductive portion; and/or along a width direction of the second groove segment, the side surface of the second groove segment includes a third side surface and a fourth side surface opposite each other, and both the third side surface and the fourth side surface are in contact with the second conductive portion. Both the first side surface and the second side surface being in contact with the first conductive portion is conducive to eliminating a discharge tip at a connection position between the first side surface and the first surface and a discharge tip at a connection position between the second side surface and the first surface. Both the third side surface and the fourth side surface being in contact with the second conductive portion is conducive to eliminating a discharge tip at a connection position between the third side surface and the first surface and a discharge tip at a connection position between the fourth side surface and the first surface.

In some embodiments, the groove further includes a third groove segment, the first groove segment is opposite the third groove segment, and the second groove segment connects the first groove segment and the third groove segment; and the first conductive layer further includes a third conductive portion, the third conductive portion is located in the third groove segment and is in contact with a side surface of the third groove segment. A region defined by the first groove segment, the second groove segment, and the third groove segment is larger, resulting in a larger area of a portion of the first wall portion that flips open after the weakened portion ruptures along the first groove segment, the second groove segment, and the third groove segment, further increasing the pressure relief area of the first wall portion. The third conductive portion of the first conductive layer being located in the third groove segment and being in contact with the side surface of the third groove segment is conducive to eliminating a discharge tip at a connection position between the side surface of the third groove segment and the first surface.

In some embodiments, along a width direction of the third groove segment, the side surface of the third groove segment includes a fifth side surface and a sixth side surface opposite each other, and both the fifth side surface and the sixth side surface are in contact with the third conductive portion. Both the fifth side surface and the sixth side surface being in contact with the third conductive portion is conducive to eliminating a discharge tip at a connection position between the fifth side surface and the first surface and a discharge tip at a connection position between the sixth side surface and the first surface.

In some embodiments, the groove is a groove extending along a closed trajectory. After the weakened portion ruptures along an extension direction of the groove, a region, defined by the groove, of the first wall portion can be entirely detached and opened. The opening of this region is less affected by the first conductive layer, enabling more timely pressure relief and providing a large pressure relief area.

In some embodiments, the first wall portion includes a wall body and a protrusion, where the wall body has a fourth surface, the protrusion is provided on the fourth surface, an outer peripheral surface of the protrusion and the fourth surface together define the recess, the recess surrounds the protrusion, the outer peripheral surface of the protrusion is the side surface, and an end surface of an end the protrusion away from the fourth surface is the first surface. The provision of the first conductive layer is conducive to eliminating a discharge tip at a connection position between the outer peripheral surface of the protrusion and the first surface.

In some embodiments, along a circumferential direction of the recess, the first conductive layer is in contact with an entire periphery of the side surface.

In some embodiments, the housing includes a housing body and an end cap, where the housing body has an opening, the end cap closes the opening, the end cap is the first wall portion, and/or at least one wall portion of the housing body is the first wall portion.

In some embodiments, the first wall portion is provided with an insulating member, and the first surface faces the insulating member. The provision of the insulating member can achieve insulation between the first wall portion and other components. Since the recess of the first wall portion is provided with the first conductive layer, the electric field distribution in the region of the recess is improved, resulting in a more uniform electric field strength distribution, and reducing the risk of the insulating member being broken down due to tip discharge and causing insulation failure.

In some embodiments, the battery cell further includes an electrode assembly, and the electrode assembly is accommodated in the housing; and the first surface faces an interior of the housing, and the insulating member is provided on a side of the first wall portion facing the electrode assembly; or the first surface faces an exterior of the housing, and the insulating member is disposed on a side of the first wall portion facing away from the electrode assembly.

According to a second aspect, an embodiment of this application provides a battery including the battery cell provided in any one of the embodiments of the first aspect.

According to a third aspect, an embodiment of this application provides an electric apparatus including the battery cell provided in any one of the embodiments of the first aspect.

BRIEF DESCRIPTION OF DRAWINGS

To describe the technical solutions in the embodiments of this application more clearly, the following briefly describes the accompanying drawings required for use in the embodiments. It is appreciated that the accompanying drawings below show merely some embodiments of this application and thus should not be considered as limitations on the scope. Persons of ordinary skill in the art may still derive other related accompanying drawings from the accompanying drawings without creative efforts.

Figure 1:
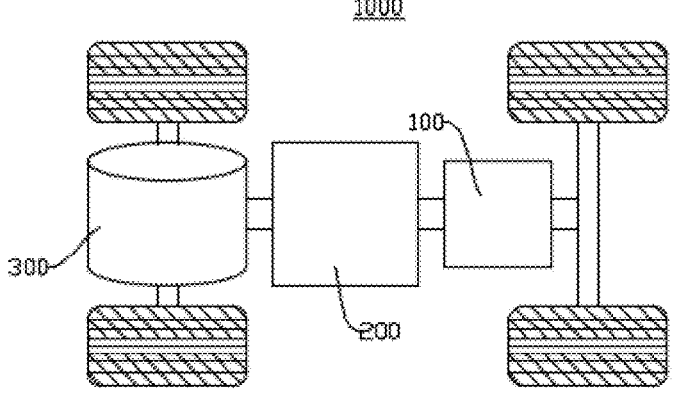
FIG. 1 is a schematic structural diagram of a vehicle according to some embodiments of this application.

Description of reference signs: 1. housing; 11. housing body; 12. end cap; 13. first wall portion; 131. first surface; 132. recess; 1321. side surface; 1322. bottom surface; 133. groove; 1331. first groove segment; 1332. second groove segment; 1333. third groove segment; 1334. first side surface; 1335. second side surface; 1336. third side surface; 1337. fourth side surface; 1338. fifth side surface; 1339. sixth side surface; 134. weakened portion; 135. wall body; 1351. fourth surface; 136. protrusion; 14. insulating member; 2. electrode assembly; 21. tab; 3. electrode terminal; 4. current collecting member; 5. first conductive layer; 51. second surface; 52. first conductive portion; 53. second conductive portion; 54. third conductive portion; 6. second conductive layer; 61. third surface; 10. battery cell; 20. box; 201. first portion; 202. second portion; 100. battery; 200. controller; 300. motor; 1000. vehicle; and Z. thickness direction.

DESCRIPTION OF EMBODIMENTS

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all embodiments of this application. All other embodiments obtained by persons of ordinary skill in the art based on the embodiments of this application without creative efforts fall within the protection scope of this application.

Unless otherwise defined, all technical and scientific terms used in this application have the same meanings as commonly understood by persons skilled in the art to which this application relates. The terms used in the specification of this application are intended to merely describe the specific embodiments rather than to limit this application. The terms "include", "comprise", "have", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to describe a particular order or a relative importance.

Reference to "embodiment" in this application means that a specific feature, structure, or characteristic described in connection with the embodiment may be included in at least one embodiment of this application. The word "embodiment" appearing in various places in this specification does not necessarily refer to the same embodiment or an independent or alternative embodiment that is exclusive of other embodiments.

In the description of this application, it should be noted that unless otherwise specified and defined explicitly, the terms "mounting", "connection", "join", and "attachment" should be understood in their general senses. For example, they may refer to a fixed connection, a detachable connection, or an integral connection, and may refer to a direct connection, an indirect connection via an intermediate medium, or an internal communication between two elements. Persons of ordinary skill in the art can understand specific meanings of these terms in the embodiments of this application as suitable to specific situations.

The term "and/or" in this application is only an associative relationship for describing associated objects, indicating that three relationships may be present. For example, A and/or B may indicate the following three cases: presence of only A; presence of both A and B; and presence of only B. In addition, the character "/" in this application generally indicates an "or" relationship between the contextually associated objects.

In some embodiments of this application, like reference signs denote like components, and for brevity, in different embodiments, detailed descriptions of like components are not repeated. It should be understood that, as shown in the accompanying drawings, sizes such as thickness, length, and width of various members and sizes such as thickness, length, and width of integrated devices in the embodiments of this application are merely for illustrative purposes and should not constitute any limitations on this application.

In this application, "a plurality of" means more than two (inclusive).

In embodiments of this application, a battery cell may be a secondary battery, and the secondary battery refers to a battery cell that can be recharged to activate active materials for continuous use after the battery cell is discharged.

The battery cell includes but is not limited to a lithium-ion battery, a sodium-ion battery, a sodium-lithium-ion battery, a lithium metal battery, a sodium metal battery, a lithium-sulfur battery, a magnesium-ion battery, a nickel-metal hydride battery, a nickel-cadmium battery, a lead storage battery.

The battery cell typically includes an electrode assembly. The electrode assembly includes a positive electrode, a negative electrode, and a separator. During charging and discharging of the battery cell, active ions (such as lithium ions) intercalate and deintercalate back and forth between the positive electrode and the negative electrode. The separator is arranged between the positive electrode and the negative electrode, which can reduce the risk of short circuit between the positive and negative electrodes while allowing active ions to pass through.

In some embodiments, the positive electrode may be a positive electrode plate, and the positive electrode plate may include a positive electrode current collector and a positive electrode active material provided on at least one surface of the positive electrode current collector.

As an example, the positive electrode current collector includes two opposite surfaces in its thickness direction, and the positive electrode active material is provided on either or both of the two opposite surfaces of the positive electrode current collector.

As an example, the positive electrode current collector may be a metal foil or a composite current collector. For example, as a metal foil, silver surface-treated aluminum, silver surface-treated stainless steel, stainless steel, copper, aluminum, nickel, baked carbon, carbon, nickel, or titanium may be used. The composite current collector may include a polymer material matrix and a metal layer. The composite current collector may be formed by forming a metal material (aluminum, aluminum alloy, nickel, nickel alloy, titanium, titanium alloy, silver, silver alloy, or the like) on a polymer material matrix (for example, a matrix of polypropylene, polyethylene terephthalate, polybutylene terephthalate, polystyrene, or polyethylene).

As an example, the positive electrode active material may include at least one of the following materials: lithium-containing phosphate, lithium transition metal oxide, and respective modified compounds thereof. However, this application is not limited to such materials, and other conventional materials that can be used as positive electrode active materials for batteries may also be used. These positive electrode active materials may be used alone or in combination of two or more. Examples of lithium-containing phosphates may include but are not limited to at least one of lithium iron phosphate (for example, $LiFePO_4$ (also abbreviated as LFP)), a composite material of lithium iron phosphate and carbon, lithium manganese phosphate (for example, $LiMnPO_4$), a composite material of lithium manganese phosphate and carbon, lithium manganese iron phosphate, and a composite material of lithium manganese iron phosphate and carbon. Examples of lithium transition metal oxides may include but are not limited to at least one of lithium cobalt oxide (for example, $LiCoO_2$), lithium nickel oxide (for example, $LiNiO_2$), lithium manganese oxide (for example, $LiMnO_2$ or $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (also abbreviated as NCM333), $LiNi_{0.5}Co_{0.2}Mn_{0.3}O_2$ (also abbreviated as NCM523), $LiNi_{0.5}Co_{0.25}Mn_{0.25}O_2$ (also abbreviated as NCM211), $LiNi_{0.6}Co_{0.2}Mn_{0.2}O_2$ (also abbreviated as NCM622), or $LiNi_{0.8}Co_{0.1}Mn_{0.1}O_2$ (also abbreviated as NCM811)), lithium nickel cobalt aluminum oxide (for example, $LiNi_{0.85}Co_{0.15}Al_{0.05}O_2$), and modified compounds thereof.

In some embodiments, the positive electrode may be foamed metal. The foamed metal may be foamed nickel, foamed copper, foamed aluminum, foamed alloy, or foamed carbon. When the foamed metal is used as the positive electrode, the surface of the foamed metal may not be provided with a positive electrode active material. Certainly, the surface of the foamed metal may be provided with a positive electrode active material. As an example, the foamed metal may also be filled with and/or deposited with a lithium source material, potassium metal, or sodium metal, where the lithium source material is lithium metal and/or a lithium-rich material.

In some embodiments, the negative electrode may be a negative electrode plate, and the negative electrode plate may include a negative electrode current collector.

As an example, the negative electrode current collector may be a metal foil, foamed metal, or a composite current collector. For example, as a metal foil, silver surface-treated aluminum or stainless steel, stainless steel, copper, aluminum, nickel, baked carbon, carbon, nickel, or titanium may be used. The foamed metal may be foamed nickel, foamed copper, foamed aluminum, foamed alloy, or foamed carbon. The composite current collector may include a polymer material matrix and a metal layer. The composite current collector may be formed by forming a metal material (copper, copper alloy, nickel, nickel alloy, titanium, titanium alloy, silver, silver alloy, or the like) on a polymer material matrix (for example, a matrix of polypropylene, polyethylene terephthalate, polybutylene terephthalate, polystyrene, or polyethylene).

As an example, the negative electrode plate may include a negative electrode current collector and a negative electrode active material provided on at least one surface of the negative electrode current collector.

As an example, the negative electrode current collector has two opposite surfaces in its thickness direction, and the negative electrode active material is provided on either or both of the two opposite surfaces of the negative electrode current collector.

As an example, the negative electrode active material may be a well-known negative electrode active material used for battery cells in the art. As an example, the negative electrode active material may include at least one of the following materials: artificial graphite, natural graphite, soft carbon, hard carbon, silicon-based materials, tin-based materials, and lithium titanate. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials, and other conventional materials that can be used as negative electrode active materials for batteries may also be used. These negative electrode active materials may be used alone or in combination of two or more.

In some embodiments, the material of the positive electrode current collector may be aluminum, and the material of the negative electrode current collector may be copper.

In some embodiments, the separator is an isolating film. The isolating film may be any well-known porous isolating film with good chemical stability and mechanical stability.

As an example, the material of the isolating film may include at least one of glass fiber, non-woven fabric, polyethylene, polypropylene, and polyvinylidene fluoride. The isolating film may be a single-layer film or a multilayer composite film. When the isolating film is a multilayer composite film, the materials of each layer may be the same or different. The separator may be an independent component located between the positive and negative electrodes or may be attached to surfaces of the positive and negative electrodes.

In some embodiments, the separator is a solid electrolyte. The solid electrolyte is arranged between the positive electrode and the negative electrode, playing the roles of transporting ions and isolating the positive and the negative electrodes.

In some embodiments, the battery cell further includes an electrolyte. The electrolyte conducts ions between the positive and negative electrodes. The electrolyte may be in a liquid state, a gel state, or a solid state. The liquid electrolyte includes an electrolytic salt and a solvent.

In some embodiments, the electrolytic salt a may include at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalate)borate, lithium bis(oxalate)borate, lithium difluorobis(oxalato)phosphate, and lithium tetrafluoro(oxalate)phosphate.

In some embodiments, the solvent may include at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone. The solvent may alternatively be an ether-based solvent. The ether-based solvent may include one or more of ethylene glycol dimethyl ether, ethylene glycol diethyl ether, diethylene glycol dimethyl ether, triethylene glycol dimethyl ether, tetraethylene glycol dimethyl ether, 1,3-dioxolane, tetrahydrofuran, methyl tetrahydrofuran, diphenyl ether, and crown ether.

The gel-state electrolyte includes a polymer as a skeleton network for the electrolyte, combined with an ionic liquid-lithium salt.

The solid electrolyte includes a polymer solid electrolyte, an inorganic solid electrolyte, and a composite solid electrolyte.

As an example, the polymer solid electrolyte may be polyether (polyethylene oxide), polysiloxane, polycarbonate, polyacrylonitrile, polyvinylidene fluoride, polymethyl methacrylate, single-ion polymer, polyionic liquid-lithium salt, cellulose, or the like.

As an example, the inorganic solid electrolyte may include one or more of an oxide solid electrolyte (crystalline perovskite, sodium superionic conductor, garnet, or an amorphous LiPON film), a sulfide solid electrolyte (crystalline lithium superionic conductor (lithium germanium phosphorus sulfide or argyrodite) or amorphous sulfide), a halide solid electrolyte, a nitride solid electrolyte, and a hydride solid electrolyte.

As an example, the composite solid electrolyte is formed by adding an inorganic solid electrolyte filler to a polymer solid electrolyte.

In some embodiments, the electrode assembly is a wound structure. The positive electrode plate and the negative electrode plate are wound into a wound structure.

In some embodiments, the electrode assembly is a laminated structure.

As an example, a plurality of positive electrode plates and a plurality of negative electrode plates may be provided respectively, where the plurality of positive electrode plates and the plurality of negative electrode plates are alternately stacked.

As an example, a plurality of positive electrode plates may be provided, the negative electrode plate is folded to form a plurality of stacked folding segments, and one positive electrode plate is sandwiched between adjacent folding segments.

As an example, both the positive electrode plate and the negative electrode plate are folded to form a plurality of stacked folding segments.

As an example, a plurality of separators may be provided and respectively disposed between any adjacent positive electrode plates or negative electrode plates.

As an example, the separators may be continuously arranged and disposed between any adjacent positive electrode plates or negative electrode plates by folding or winding.

In some embodiments, the shape of the electrode assembly may be cylindrical, flat, or prismatic.

In some embodiments, the electrode assembly is provided with tabs, where the tabs are capable of conducting current from the electrode assembly. The tabs include a positive tab and a negative tab.

In some embodiments, the battery cell may include a housing. The housing is configured to encapsulate the electrode assembly, the electrolyte, and other components. The housing may be a steel housing, an aluminum housing, a plastic housing (for example, polypropylene), a composite metal housing (for example, a copper-aluminum composite housing), an aluminum-plastic film, or the like.

As an example, the battery cell may be a cylindrical battery cell, a prismatic battery cell, a pouch battery cell, or a battery cell of another shape. The prismatic battery cell includes a square shell battery cell, a blade battery cell, and a polygonal battery. The polygonal battery is, for example, a hexagonal battery.

The battery mentioned in the embodiments of this application refers to a single physical module including one or more battery cells to provide higher voltage and capacity.

In some embodiments, the battery may be a battery module, and when there are a plurality of battery cells, the plurality of battery cells are arranged and fastened to form a battery module.

In some embodiments, the battery may be a battery pack, the battery pack includes a box and a battery cell, and the battery cell or the battery module is accommodated in the box.

In some embodiments, the box may be used as part of a chassis structure of a vehicle. For example, part of the box may become at least part of a floor of a vehicle, or part of the box may become at least parts of a cross beam and longitudinal beam of a vehicle.

In some embodiments, the battery may be an energy storage apparatus. The energy storage apparatus includes an energy storage container, an energy storage electric cabinet, and the like.

For a typical battery cell, the battery cell includes a housing and an electrode assembly, where the electrode assembly is accommodated in the housing. To achieve insulation between the housing and other components, an insulating member may be provided on a surface of a wall portion of the housing. For example, an insulating member may be provided on an inner surface of the wall portion to achieve insulation between the wall portion and the electrode assembly; or an insulating member may be provided on an outer surface of the wall portion to achieve insulation between the wall portion and external components.

To meet the usage requirements of the battery cell, the surface of the wall portion of the housing may have an uneven structure. For example, to meet the pressure relief requirements of the battery cell, a groove may be provided on the surface of the wall portion, so that the wall portion can rupture along the groove during thermal runaway of the battery cell to achieve pressure relief. Due to the uneven structure on the surface of the wall portion, when the battery cell is in a high-voltage environment, for example, the battery cell is in an energy storage system, the electric field strength distribution in the uneven region of the wall portion is non-uniform, and tip discharge is likely to occur in the uneven region, easily leading to the risk of insulation failure and affecting the reliability of the battery cell.

In view of this, an embodiment of this application provides a battery cell, where a first wall portion of a housing is provided with a recess, the recess has a side surface connected to a first surface of the first wall portion, a first conductive layer is provided in the recess, and the first conductive layer extends from the first surface into the recess and is connected to the side surface.

In such a battery cell, the provision of the first conductive layer improves the electric field distribution in a region, provided with the recess, of the first wall portion, resulting in a more uniform electric field strength distribution, reducing the risk of tip discharge at a connection position between the side surface and the first surface in a high-voltage environment, and improving the reliability of the battery cell.

The technical solutions described in the embodiments of this application are applicable to batteries and electric apparatuses using batteries.

The electric apparatus may be a vehicle, a mobile phone, a portable device, a notebook computer, a ship, a spacecraft, an electric toy, an electric tool, or the like. The vehicle may be a fuel vehicle, a gas vehicle, or a new energy vehicle, and the new energy vehicle may be a battery electric vehicle, a hybrid electric vehicle, or an extended-range vehicle. The spacecraft includes an airplane, a rocket, a space shuttle, a spaceship, and the like. The electric toy includes a fixed or mobile electric toy, for example, a game console, an electric toy car, an electric toy ship, an electric toy airplane, and the like. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer.

For ease of description, an example that the electric apparatus is a vehicle is used for description in the following embodiments.

Referring to FIG. 1, FIG. 1 is a schematic structural diagram of a vehicle 1000 according to some embodiments of this application. A battery 100 is provided inside the vehicle 1000, and the battery 100 may be disposed at the bottom, head, or tail of the vehicle 1000. The battery 100 may be configured to supply power to the vehicle 1000. For example, the battery 100 may be used as an operational power source for the vehicle 1000.

The vehicle 1000 may further include a controller 200 and a motor 300. The controller 200 is configured to control the battery 100 to supply power to the motor 300, for example, to satisfy power needs of start, navigation, and driving of the vehicle 1000.

In some embodiments of this application, the battery 100 can be used not only as the operational power source for the vehicle 1000 but also as a driving power source for the vehicle 1000, replacing or partially replacing fossil fuel or natural gas to provide driving traction for the vehicle 1000.

Figure 2:
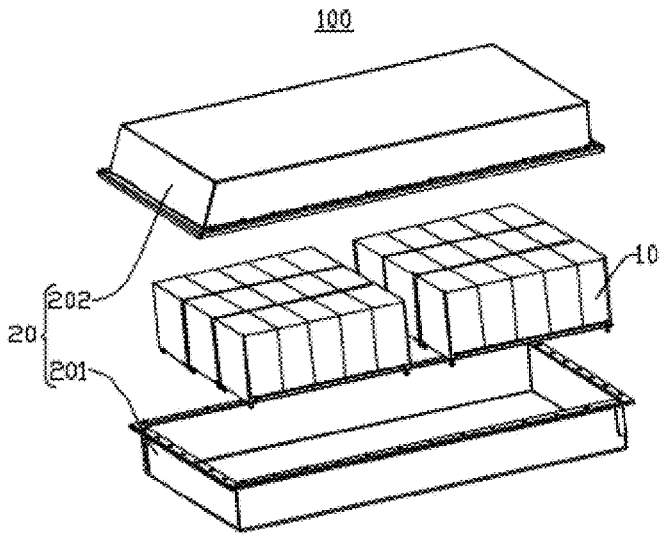
FIG. 2 is an exploded view of a battery according to some embodiments of this application.

Referring to FIG. 2, FIG. 2 is an exploded view of a battery 100 according to some embodiments of this application. The battery 100 may include a battery cell 10 and a box 20, where the battery cell 10 is accommodated in the box 20.

The box 20 is a component that accommodates the battery cell 10, the box 20 provides an accommodating space for the battery cell 10, and the box 20 may adopt various structures. In some embodiments, the box 20 may include a first portion 201 and a second portion 202, where the first portion 201 and the second portion 202 fit together to define an accommodating space for accommodating the battery cell 10. The first portion 201 and the second portion 202 may have various shapes, for example, cuboid, cylinder, or the like. The first portion 201 may be a hollow structure with an opening formed at one side, and the second portion 202 may also be a hollow structure with an opening formed at one side, where the opening side of the second portion 202 is engaged with the opening side of the first portion 201 to form a box 20 having an accommodating space. Alternatively, the first portion 201 may be a hollow structure with an opening formed at one side, and the second portion 202 may be a plate structure, where the second portion 202 covers the opening side of the first portion 201 to form a box 20 having an accommodating space. The first portion 201 and the second portion 202 may be sealed by a sealing element, and the sealing element may be a sealing ring, a sealing adhesive, or the like.

There may be one or more battery cells 10 in the battery 100. If there are a plurality of battery cells 10, the plurality of battery cells 10 may be connected in series, parallel, or series-parallel, where being connected in series-parallel means a combination of series and parallel connections of the plurality of battery cells 10. The plurality of battery cells 10 may be connected in series, parallel, or series-parallel first to form a battery module, and a plurality of battery modules may then be connected in series, parallel, or series-parallel to form an entirety which is accommodated in the box 20. Alternatively, all battery cells 10 may be directly connected in series, parallel, or series-parallel, and an entirety formed by all battery cells 10 is accommodated in the box 20.

Figure 3:
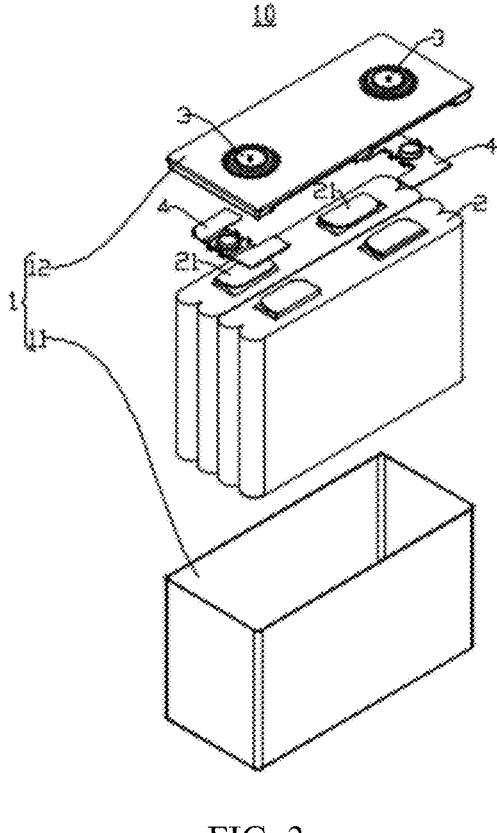
FIG. 3 is an exploded view of a battery cell according to some embodiments of this application.

Referring to FIG. 3, FIG. 3 is an exploded view of a battery cell 10 according to some embodiments of this application. The battery cell 10 may include a housing 1 and an electrode assembly 2, where the electrode assembly 2 is accommodated in the housing 1.

In some embodiments, the housing 1 may include a housing body 11 and an end cap 12, where the housing body 11 has an opening, and the end cap 12 closes the opening of the housing body 11.

The housing body 11 is a component for accommodating the electrode assembly 2, and the housing body 11 may be a hollow structure with an opening formed at one end, or the housing body 11 may be a hollow structure with openings formed at two opposite ends. The housing body 11 may be in a variety of shapes, for example, cylinder or cuboid. The material of the housing body 11 may be made of various materials such as copper, iron, aluminum, steel, and aluminum alloy.

The end cap 12 is a component that closes the opening of the housing body 11 to isolate the internal environment of the battery cell 10 from the external environment. The end cap 12 and the housing body 11 together define an accommodating space for accommodating the electrode assembly 2, the electrolyte, and other components. The end cap 12 may be connected to the housing body 11 by welding or crimping to close the opening of the housing body 11. The shape of the end cap 12 may be adapted to the shape of the housing 1, for example, the housing body 11 is a cuboidal structure, and the end cap 12 is a rectangular plate structure adapted to the housing 1. For another example, the housing body 11 is a cylindrical structure, and the end cap 12 is a circular plate structure adapted to the housing body 11. The material of the end cap 12 may also be made of various materials such as copper, iron, aluminum, steel, and aluminum alloy. The material of the end cap 12 may be the same as or different from that of the housing body 11.

In an embodiment where the housing body 11 has an opening formed at one end, one end cap 12 may be provided correspondingly. In an embodiment where the housing body 11 has openings formed at two opposite ends, two end caps 12 may be provided correspondingly, the two end caps 12 respectively close the two openings of the housing body 11, and the two end caps 12 and the housing body 11 together define an accommodating space.

In some embodiments, the battery cell 10 may further include an electrode terminal 3, where the electrode terminal 3 is disposed on the housing 1, the electrode terminal 3 is configured to be electrically connected to a tab 21 of the electrode assembly 2 to output the electrical energy of the battery cell 10. The electrode terminal 3 may be disposed on the housing body 11 of the housing 1 or disposed on the end cap 12 of the housing 1. The electrode terminal 3 and the tab 21 may be directly connected to each other, for example, the electrode terminal 3 and the tab 21 are directly welded. The electrode terminal 3 and the tab 21 may alternatively be indirectly connected to each other, for example, the electrode terminal 3 and the tab 21 are indirectly connected to each other through a current collecting member 4. The current collecting member 4 may be a metal conductor, for example, copper, iron, aluminum, steel, or aluminum alloy.

As an example, as shown in FIG. 3, the housing body 11 has an opening formed at one end, one end cap 12 is provided in the housing 1, and one end cap 12 closes one opening of the housing body 11. The end cap 12 is provided with two electrode terminals 3, where the two electrode terminals 3 are a positive electrode terminal and a negative electrode terminal respectively. The electrode assembly 2 has a positive tab and a negative tab formed at one end facing the end cap 12, the positive electrode terminal is connected to the positive tab through one current collecting member 4, and the negative electrode terminal is connected to the negative tab through another current collecting member 4.

Figure 4:
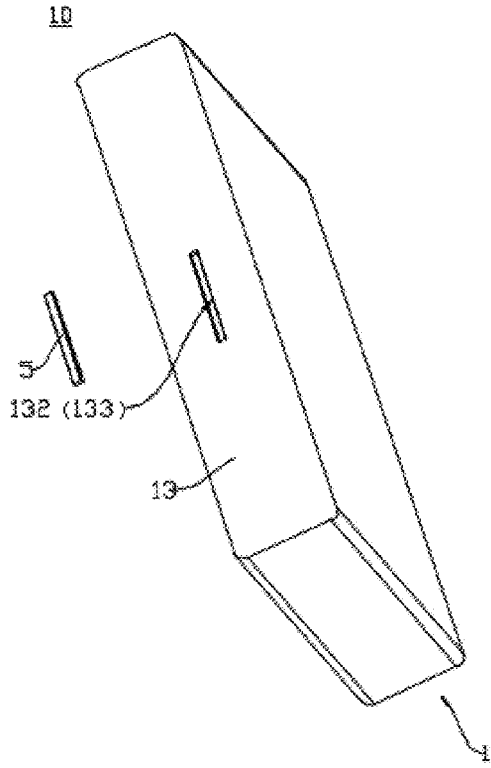
FIG. 4 is a schematic structural diagram of a battery cell according to some embodiments of this application (with a first conductive layer separated from a housing)
Figure 5:
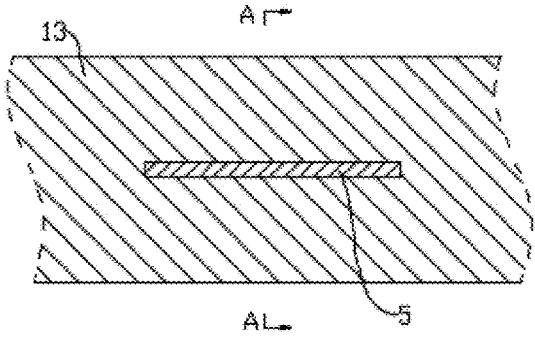
FIG. 5 is a partial view of the battery cell shown in FIG. 4.
Figure 6:
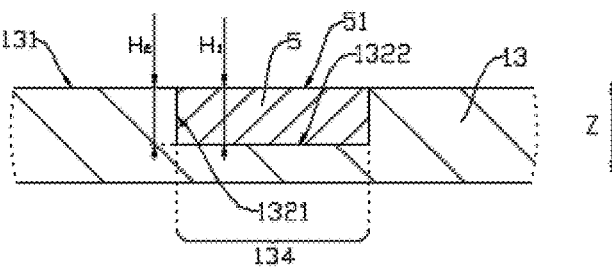
FIG. 6 is a cross-sectional view along A-A in FIG. 5.

Referring to FIG. 4 to FIG. 6, FIG. 4 is a schematic structural diagram of a battery cell 10 according to some embodiments of this application (with a first conductive layer 5 separated from a housing 1); FIG. 5 is a partial view of the battery cell 10 shown in FIG. 4; and FIG. 6 is a cross-sectional view along A-A in FIG. 5. An embodiment of this application provides a battery cell 10 including a housing 1 and a first conductive layer 5. The housing 1 includes a first wall portion 13, where the first wall portion 13 has a first surface 131, the first wall portion 13 is provided with a recess 132, and the recess 132 has a side surface 1321 connected to the first surface 131. The first conductive layer 5 is accommodated in the recess 132, and the first conductive layer 5 is in contact with the side surface 1321.

The first wall portion 13 may be an end cap 12 of the housing 1, the first wall portion 13 may alternatively be at least one wall portion of the housing body 11 of the housing 1, or the first wall portion 13 may be a pressure relief component mounted on the end cap 12 or the housing body 11. The pressure relief component may be a component, for example, a rupture disk or a pressure relief valve.

The first surface 131 may be an outer surface of the first wall portion 13 or an inner surface of the first wall portion 13. The inner surface of the first wall portion 13 faces an interior of the housing 1, and the outer surface of the first wall portion 13 faces an exterior of the housing 1.

A depth direction of the recess 132 may be parallel to a thickness direction Z of the first wall portion 13. The recess 132 may be a groove provided on the first surface 131; or the first wall portion 13 may be formed with a protrusion, where the recess 132 is a recessed structure formed around the protrusion. The side surface 1321 is a surface of the recess 132 extending circumferentially, the side surface 1321 is connected to the first surface 131, and an intersection line of the side surface 1321 with its vertical cross-section may be perpendicular to the first surface 131, or the side surface 1321 is arranged at an obtuse or acute angle with the first surface 131. The vertical cross-section of the side surface 1321 is parallel to the thickness direction Z of the first wall portion 13. Along a circumferential direction of the recess 132, the first conductive layer 5 may be in contact with an entire periphery of the side surface 1321 or may be in partial contact with the side surface 1321.

The first conductive layer 5 is made of a conductive material, for example, copper, iron, aluminum, steel, or aluminum alloy. The first wall portion 13 is also made of a conductive material. The material of the first wall portion 13 may be the same as or different from the material of the first conductive layer 5. The first conductive layer 5 is in contact with the side surface 1321, achieving electrical connection between the first conductive layer 5 and the first wall portion 13. It should be noted that the first conductive layer 5 may form an interference fit with the side surface 1321 to maintain contact between the first conductive layer 5 and the side surface 1321; or the first conductive layer 5 may be fixedly connected to the side surface 1321 to maintain contact between the first conductive layer 5 and the side surface 1321. The first conductive layer 5 may fill the recess 132 or may not fill the recess 132, and the first conductive layer 5 may be entirely below the first surface 131 or may extend from the first surface 131 into the recess 132.

In this embodiment of this application, the recess 132 is internally provided with the first conductive layer 5 connected to the side surface 1321. The provision of the first conductive layer 5 improves the electric field distribution in a region, provided with the recess 132, of the first wall portion 13, resulting in a more uniform electric field strength distribution, reducing the risk of tip discharge at a connection position between the side surface 1321 and the first surface 131 in a high-voltage environment, and improving the reliability of the battery cell 10.

In some embodiments, the first conductive layer 5 extends from the first surface 131 into the recess 132.

In these embodiments, the first conductive layer 5 extends from the first surface 131 into the recess 132. This ensures that the first conductive layer 5 is not entirely below the first surface 131, which is conducive to eliminating a discharge tip at the connection position between the side surface 1321 and the first surface 131, further reducing the risk of tip discharge at the connection position between the side surface 1321 and the first surface 131 in the high-voltage environment.

In other embodiments, the first conductive layer 5 may be entirely below the first surface 131.

In some embodiments, the recess 132 has a bottom surface 1322 facing the first conductive layer 5, and the bottom surface 1322 is connected to the side surface 1321; and the first conductive layer 5 is in contact with the bottom surface 1322.

The side surface 1321 and the bottom surface 1322 of the recess 132 may together define an internal space of the recess 132. The side surface 1321 is connected between the first surface 131 and the bottom surface 1322. The bottom surface 1322 of the recess 132 may be a plane; or the bottom surface 1322 of the recess 132 may not be a plane. For example, the bottom surface 1322 of the recess 132 is a circular arc surface, a conical surface, or the like.

In these embodiments, the first conductive layer 5 being in contact with the bottom surface 1322 can reduce the risk of tip discharge at a connection position between the bottom surface 1322 of the recess 132 and the side surface 1321 in a high-voltage environment, further improving the reliability of the battery cell 10.

In some embodiments, the first conductive layer 5 fills the recess 132.

It can be understood that the first conductive layer 5 occupies the entire space of the recess 132.

In these embodiments, the first conductive layer 5 fills the recess 132. This is conducive to eliminating as many discharge tips as possible in the region, provided with the recess 132, of the first wall portion 13. As an example where the side surface 1321 is rectangular, the side surface 1321 includes four side surfaces sequentially connected end-to-end along a circumferential direction of the recess 132. The first conductive layer 5 filling the recess 132 can eliminate discharge tips at a connection position between two adjacent side surfaces, a connection position between each side surface and the first surface 131, and a connection position between each side surface and the bottom surface 1322.

Figure 7:
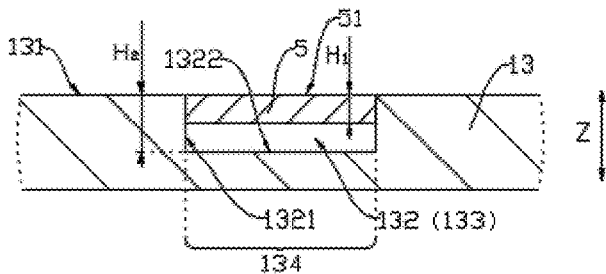
FIG. 7 is a schematic diagram of a connection between a first conductive layer and a first wall portion according to some other embodiments of this application.

In some embodiments, referring to FIG. 7, FIG. 7 is a schematic diagram of a connection of a first conductive layer 5 and a first wall portion 13 according to some other embodiments of this application. The recess 132 has a bottom surface 1322 facing the first conductive layer 5, and the bottom surface 1322 is connected to the side surface 1321; and the first conductive layer 5 is spaced apart from the first surface 131.

It can be understood that there is a gap between the first conductive layer 5 and the first surface 131, and the first conductive layer 5 is not in contact with the first surface 131.

In these embodiments, the first conductive layer 5 being spaced apart from the first surface 131 can reduce materials used for the first conductive layer 5, thereby saving costs.

In some embodiments, a maximum thickness of the first conductive layer 5 is denoted as $H_1$, and a maximum depth of the recess 132 is denoted as $H_2$, satisfying:

$$0.1 \leq H_1/H_2 \leq 1.$$

A thickness at the thickest position of the first conductive layer 5 is the maximum thickness of the first conductive layer 5. Along the depth direction of the recess 132, a maximum distance between the bottom surface 1322 of the recess 132 and the first surface 131 is the maximum depth of the recess 132. For example, the bottom surface 1322 of the recess 132 is a plane, the bottom surface 1322 of the recess 132 is parallel to the first surface 131, and along a direction perpendicular to the first surface 131, a distance between the bottom surface 1322 of the recess 132 and the first surface 131 is the maximum depth of the recess 132. For another example, the bottom surface 1322 of the recess 132 is a circular arc surface, and along a direction perpendicular to the first surface 131, a distance between a position of the bottom surface 1322 of the recess 132 farthest from the first surface 131 and the first surface 131 is the maximum depth of the recess 132.

$H_1/H_2$ may be any point value of 0.1, 0.2, 0.3, 0.4, 0.5, 0.6, 0.7, 0.8, 0.9, 1, or a value in a range defined by any two of these values.

In the embodiments shown in FIG. 6, $H_1/H_2=1$. In the embodiments shown in FIG. 7, $H_1/H_2<1$.

In these embodiments, $0.1 \leq H_1/H_2 \leq 1$. This ensures that the thickness of the first conductive layer 5 is not too small, and the first conductive layer 5 is less likely to fail due to the too small thickness, which is conducive to eliminating the discharge tip at the connection position between the side surface 1321 and the first surface 131. In some embodiments, $0.4 \leq H_1/H_2 \leq 1$.

In these embodiments, $H_1/H_2$ may be any point value of 0.4, 0.42, 0.45, 0.48, 0.5, 0.52, 0.55, 0.58, 0.6, 0.62, 0.65, 0.68, 0.7, 0.72, 0.75, 0.78, 0.8, 0.82, 0.85, 0.88, 0.9, 0.92, 0.95, 0.98, 1, or a value in a range defined by any two of these values.

In these embodiments, $0.4 \leq H_1/H_2 \leq 1$. This further increases the thickness of the first conductive layer 5, is conducive to eliminating the discharge tip at the connection position between the side surface 1321 and the first surface 131, and is conducive to increasing a contact area between the first conductive layer 5 and the first wall portion 13.

In some embodiments, referring to FIG. 6 and FIG. 7, the first conductive layer 5 has a second surface 51 farthest from the bottom surface 1322 of the recess 132, and the second surface 51 of the first conductive layer 5 is flush with the first surface 131.

If there is no significant height difference between an outer edge of the second surface 51 and an inner edge of the first surface 131, it can be understood that the second surface 51 is flush with the first surface 131.

As an example, the second surface 51 and the first surface 131 are located in the same plane.

In these embodiments, the second surface 51 of the first conductive layer 5 being flush with the first surface 131 makes the second surface 51 coplanar with the first surface 131, resulting in a flatter region, provided with the recess 132, of the first wall portion 13, with a more uniform electric field strength distribution in this region.

In some embodiments, the first conductive layer 5 is a conductive adhesive layer bonded to the first wall portion 13.

The conductive adhesive layer may be formed by curing or drying an adhesive with conductive properties. The conductive adhesive layer may include a resin substrate, conductive particles, and a dispersant additive. The resin substrate may include at least one of epoxy resin, acrylate resin, polyurethane, and the like. The conductive particles may include powder made of at least one of gold, silver, copper, aluminum, zinc, iron, nickel, and the like.

It should be noted that in the embodiments where the first conductive layer 5 is in contact with the bottom surface 1322 of the recess 132, the first conductive layer 5 is bonded to the side surface 1321 and the bottom surface 1322 of the recess 132; and in the embodiments where the first conductive layer 5 is spaced apart from the bottom surface 1322 of the recess 132, the first conductive layer 5 is bonded to the side surface 1321 of the recess 132.

In these embodiments, the first conductive layer 5 is a conductive adhesive layer bonded to the first wall portion 13. This ensures that the first conductive layer 5 has a high connection strength with the first wall portion 13, making it less likely for the first conductive layer 5 to detach from the recess 132. During formation, applying a conductive adhesive into the recess 132 can correspondingly form the first conductive layer 5, making the formation of the first conductive layer 5 convenient.

Figure 8:
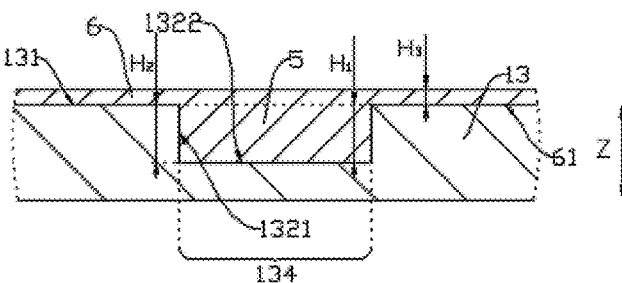
FIG. 8 is a schematic diagram of a connection of a first conductive layer, a second conductive layer, and a first wall portion according to some embodiments of this application.
Figure 9:
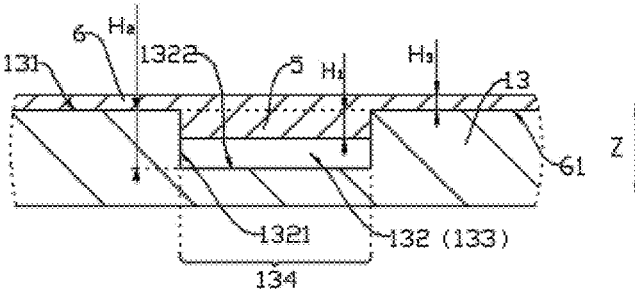
FIG. 9 is a schematic diagram of a connection of a first conductive layer, a second conductive layer, and a first wall portion according to some other embodiments of this application.

In some embodiments, referring to FIG. 8 and FIG. 9, FIG. 8 is a schematic diagram of a connection of a first conductive layer 5, a second conductive layer 6, and a first wall portion 13 according to some embodiments of this application; and FIG. 9 is a schematic diagram of a connection of a first conductive layer 5, a second conductive layer 6, and a first wall portion 13 according to some other embodiments of this application. The battery cell 10 further includes a second conductive layer 6, the second conductive layer 6 has a third surface 61, the third surface 61 is in contact with the first surface 131, the first conductive layer 5 extends from the third surface 61 into the recess 132, and the second conductive layer 6 covers the recess 132.

The second conductive layer 6 may be placed on the first surface 131, so that the third surface 61 is in contact with the first surface 131, or the second conductive layer 6 may be fixedly connected to the first surface 131, so that the third surface 61 is in contact with the second surface 51.

The second conductive layer 6 is made of a conductive material, for example, copper, iron, aluminum, steel, or aluminum alloy. The material of the second wall portion may be the same as or different from the material of the first conductive layer 5. The second conductive layer 6 and the first conductive layer 5 may be integrally formed or separately provided. If the second conductive layer 6 and the first conductive layer 5 are integrally formed, the second conductive layer 6 and the first conductive layer 5 are integrated as one component, the component may be referred to as a conductive member, and the second conductive layer 6 and the first conductive layer 5 are two parts of the conductive member. If the second conductive layer 6 and the first conductive layer 5 are separately provided, the second conductive layer 6 and the first conductive layer 5 are two components, and the two components can be manufactured separately and connected to each other.

As an example, the second conductive layer 6 includes an overlapping region overlapping with the first conductive layer 5 and a non-overlapping region not overlapping with the first conductive layer 5, where the non-overlapping region is in contact with the first surface 131.

In the embodiments shown in FIG. 8, the first conductive layer 5 is in contact with the bottom surface 1322 of the recess 132; and in the embodiments shown in FIG. 9, the first conductive layer 5 is spaced apart from the bottom surface 1322 of the recess 132.

In these embodiments, the second conductive layer 6 covering the recess 132 can conceal the recess 132, improving aesthetics. Additionally, the third surface 61 of the second conductive layer 6 being in contact with the first surface 131 and the first conductive layer 5 being in contact with the side surface 1321 are conducive to eliminating the discharge tip at the connection position between the side surface 1321 and the first surface 131.

In some embodiments, still referring to FIG. 8 and FIG. 9, the second conductive layer 6 covers the first surface 131.

The second conductive layer 6 covering the first surface 131 means that the second conductive layer 6 completely shields the first surface 131, and no part of the first surface 131 is exposed.

In these embodiments, the second conductive layer 6 covering the first surface 131 reduces the risk of forming a discharge tip between an outer peripheral surface of the second conductive layer 6 and the first surface 131.

In some embodiments, still referring to FIG. 8 and FIG. 9, a surface of the second conductive layer 6 facing away from the first surface 131 is a plane.

In these embodiments, the surface of the second conductive layer 6 facing away from the first surface 131 is not provided with a concave-convex structure.

In these embodiments, the surface of the second conductive layer 6 facing away from the first surface 131 being a plane reduces the risk of forming a discharge tip due to unevenness of the surface of the second conductive layer 6 facing away from the first surface 131.

In some embodiments, still referring to FIG. 8 and FIG. 9, a maximum thickness of the first conductive layer 5 is denoted as $H_1$, a maximum depth of the recess 132 is denoted as $H_2$, and a maximum thickness of the second conductive layer 6 is denoted as $H_3$, satisfying: $0.1 \leq (H_1 + H_3)/H_2 \leq 20$.

A thickness at the thickest position of the second conductive layer 6 is the maximum thickness of the second conductive layer 6. $H_1 + H_3$ is a maximum total thickness of the second conductive layer 6 and the first conductive layer 5. As an example, the thickness of the second conductive layer 6 and the thickness of the first conductive layer 5 are both uniform, and $H_1 + H_3$ is a total thickness of the second conductive layer 6 and the first conductive layer 5.

$(H_1 + H_3)/H_2$ may be any point value of 0.1, 1, 2, 3, 4, 5, 6, 7, 8, 9, 10, 11, 12, 13, 14, 15, 16, 17, 18, 19, 20, or a value in a range defined by any two of these values.

In these embodiments, $(H_1 + H_3)/H_2 \geq 0.1$ ensures that the total thickness of the first conductive layer 5 and the second conductive layer 6 is not too small, allowing the first conductive layer and the second conductive layer to have sufficient structural strength. $(H_1 + H_3)/H_2 \leq 20$ ensures that the total thickness of the first conductive layer 5 and the second conductive layer 6 is not too large, reducing materials used and production costs.

In some embodiments, $1 \leq (H_1 + H_3)/H_2 \leq 5$.

In these embodiments, $(H_1 + H_3)/H_2$ may be any point value of 1, 1.2, 1.5, 1.8, 2, 2.2, 2.5, 2.8, 3, 3.2, 3.5, 3.8, 4, 4.2, 4.5, 4.8, 5, or a value in a range defined by any two of these values.

In some embodiments, the first conductive layer 5 and the second conductive layer 6 are integrally formed. The first conductive layer 5 and the second conductive layer 6 being an entirety have good structural strength, reducing the difficulty of forming the first conductive layer 5 and the second conductive layer 6.

In some embodiments, the second conductive layer 6 is a conductive adhesive layer bonded to the first wall portion 13.

It can be understood that in the embodiments where the first conductive layer 5 and the second conductive layer 6 are integrally formed, both the first conductive layer 5 and the second conductive layer 6 are conductive adhesive layers.

In these embodiments, the second conductive layer 6 is a conductive adhesive layer bonded to the first wall portion 13. This ensures that the second conductive layer 6 has a high connection strength with the first wall portion 13, making it less likely for the second conductive layer 6 to detach from the first surface 131.

During formation, applying a conductive adhesive to the first surface 131 can correspondingly form the second conductive layer 6, making the formation of the second conductive layer 6 convenient.

In some embodiments, a conductivity of the first wall portion 13 is denoted as $Q_1$, and a conductivity of the first conductive layer 5 is denoted as $Q_2$, satisfying: $0.5 \leq Q_2/Q_1 \leq 1.5$.

In these embodiments, $Q_2/Q_1$ may be any point value of 0.5, 0.6, 0.7, 0.8, 0.9, 1, 1.1, 1.2, 1.3, 1.4, 1.5, or a value in a range defined by any two of these values.

It can be understood that the conductivity of the first wall portion 13 may be greater than the conductivity of the first conductive layer 5, or the conductivity of the first wall portion 13 may be less than the conductivity of the first conductive layer 5, or the conductivity of the first wall portion 13 may be equal to the conductivity of the first conductive layer 5.

As an example, the second conductive layer 6 is made of the same material as the first conductive layer 5, and the conductivity of the second conductive layer 6 is equal to the conductivity of the first conductive layer 5.

In these embodiments, $0.5 \leq Q_2/Q_1 \leq 1.5$ ensures that the conductivity of the first conductive layer 5 is not significantly different from the conductivity of the first wall portion 13, making the conductive performance of the first conductive layer 5 and the first wall portion 13 relatively similar, which is conducive to eliminating the discharge tip at the connection position between the side surface 1321 and the first surface 131.

In some embodiments, along a thickness direction Z of the first wall portion 13, the first surface 131 faces an interior of the housing 1, or the first surface 131 faces an exterior of the housing 1.

As an example, in the embodiments shown in FIG. 6 to FIG. 9, the first surface 131 faces the exterior of the housing 1.

If the first surface 131 faces the interior of the housing 1, the first surface 131 may serve as the inner surface of the first wall portion 13, the recess 132 is located on an inner side of the first wall portion 13, the first conductive layer 5 is not exposed to the exterior of the housing 1, the housing 1 provides protection to the first conductive layer 5, and the first conductive layer 5 is less likely to be damaged. If the first surface 131 faces the exterior of the housing 1, the first surface 131 may serve as the outer surface of the first wall portion 13, the recess 132 is located on an outer side of the first wall portion 13, facilitating the placement of the first conductive layer 5 in the recess 132.

In some embodiments, still referring to FIG. 4 to FIG. 9, the recess 132 is a groove 133 provided on the first surface 131, and a side surface of the groove 133 is the side surface 1321.

The groove 133 may have various shapes. For example, the groove 133 is a linear groove, an arc-shaped groove, an annular groove, a V-shaped groove, an H-shaped groove, or the like. As an example where the groove 133 is a linear groove, the side surface of the groove 133 may include four side surfaces sequentially connected end-to-end, where two side surfaces are opposite each other along a length direction of the groove 133, and the other two side surfaces are opposite each other along a width direction of the groove 133.

It can be understood that the bottom surface 1322 of the recess 132 is a bottom surface of the groove 133.

In these embodiments, the provision of the first conductive layer 5 is conducive to eliminating a discharge tip at a connection position between the side surface of the groove 133 and the first surface 131.

In some embodiments, still referring to FIG. 4 to FIG. 9, the first wall portion 13 forms a weakened portion 134 in a region provided with the groove 133, and the weakened portion 134 is configured to be capable of rupturing to release internal pressure of the battery cell 10.

The weakened portion 134 is the remaining part of a region corresponding to the groove 133 of the first wall portion 13 after the groove 133 is provided, that is, the weakened portion 134 is a bottom wall of the groove 133. The strength of the weakened portion 134 is less than the strength of other parts of the first wall portion 13 excluding the weakened portion 134, making the weakened portion 134 more susceptible to damage. During thermal runaway of the battery cell 10, when the internal pressure of the battery cell 10 reaches a threshold, the pressure relief portion can rupture to release the internal pressure of the battery cell 10.

When viewed along the thickness direction Z of the first wall portion 13, an extension direction of the weakened portion 134 is the same as an extension direction of the groove 133. For example, the groove 133 is a linear groove formed by extending along a straight trajectory, and the weakened portion 134 is a strip-shaped structure extending along a straight trajectory. For another example, the groove 133 is an annular groove formed by extending along a closed trajectory, and the weakened portion 134 is an annular structure formed by extending along a closed trajectory.

In these embodiments, the first wall portion 13 has a pressure relief function, allowing the weakened portion 134 to rupture during thermal runaway of the battery cell 10 to release internal pressure of the battery cell 10. In the case where the first conductive layer 5 is spaced apart from the bottom surface 1322 of the recess 132, during pressure relief, the first conductive layer 5 is more likely to detach from the groove 133, resulting in little impact on the burst pressure of the battery cell 10.

Figure 10:
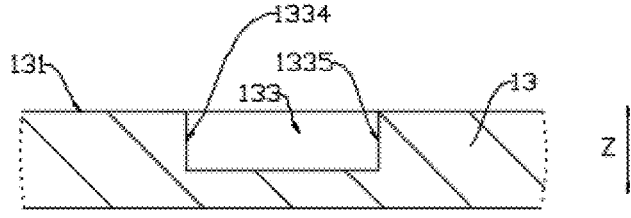
FIG. 10 is a schematic structural diagram of a first wall portion shown in FIG. 6.

In some embodiments, referring to FIG. 10, FIG. 10 is a schematic structural diagram of a first wall portion 13 shown in FIG. 6. The side surface of the groove 133 includes a first side surface 1334 and a second side surface 1335 opposite each other, and the first conductive layer 5 (not shown in FIG. 10) is in contact with both the first side surface 1334 and the second side surface 1335.

The side surface of the groove 133 may include a plurality of side surfaces, and the first side surface 1334 and the second side surface 1335 may be any two opposite side surfaces among the plurality of side surfaces. For example, the groove 133 is a linear groove, and the first side surface 1334 and the second side surface 1335 may be two side surfaces opposite each other along the length direction of the groove 133 or two side surfaces opposite each other along the width direction of the groove 133. In the embodiments shown in FIG. 10, the first side surface 1334 and the second side surface 1335 are two side surfaces opposite each other along the width direction of the groove 133. For another example, the groove 133 is an annular groove, and both the first side surface 1334 and the second side surface 1335 are annular surfaces connected end-to-end, where the first side surface 1334 may surround an outer side of the second side surface 1335, and an annular groove is formed between the first side surface 1334 and the second side surface 1335.

If both the first side surface 1334 and the second side surface 1335 are planes, the first side surface 1334 and the second side surface 1335 may be arranged parallel to each other or arranged at an acute or obtuse angle.

As an example, the first conductive layer 5 is fixedly connected to the first side surface 1334 and the second side surface 1335 to achieve contact between the first conductive layer 5 and both the first side surface 1334 and the second side surface 1335.

In these embodiments, both the first side surface 1334 and the second side surface 1335 are in contact with the first conductive layer 5. This is conducive to eliminating a discharge tip at a connection position between the first side surface 1334 and the first surface 131 and a discharge tip at a connection position between the second side surface 1335 and the first surface 131.

In other embodiments, one of the first side surface 1334 and the second side surface 1335 may be in contact with the first conductive layer 5, and the other is not in contact with the first conductive layer 5.

Figure 11:
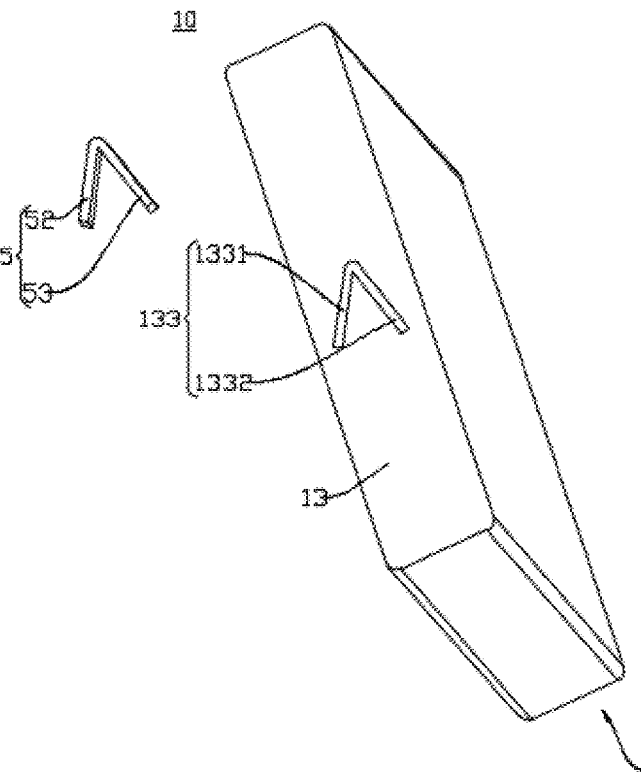
FIG. 11 is a schematic structural diagram of a battery cell according to some other embodiments of this application (with a first conductive layer separated from a housing)
Figure 12:
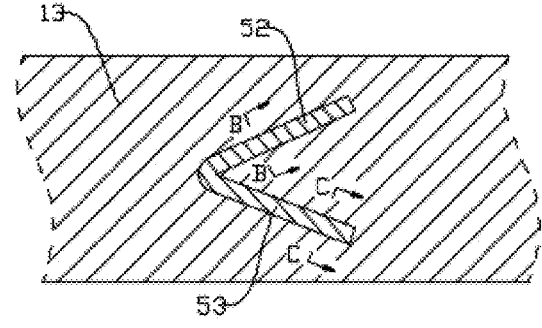
FIG. 12 is a partial view of the battery cell shown in FIG. 11.

In some embodiments, referring to FIG. 11 and FIG. 12, FIG. 11 is a schematic structural diagram of a battery cell 10 according to some other embodiments of this application (with a first conductive layer 5 separated from a housing 1); and FIG. 12 is a partial view of the battery cell 10 shown in FIG. 11. The groove 133 includes a first groove segment 1331 and a second groove segment 1332, the second groove segment 1332 is connected to the first groove segment 1331, and an extension direction of the second groove segment 1332 intersects an extension direction of the first groove segment 1331; and the first conductive layer 5 includes a first conductive portion 52 and a second conductive portion 53, the first conductive portion 52 is located in the first groove segment 1331 and is in contact with a side surface of the first groove segment 1331, and the second conductive portion 53 is located in the second groove segment 1332 and is in contact with a side surface of the second groove segment 1332.

The first groove segment 1331 and the second groove segment 1332 may be linear grooves extending along a straight trajectory or non-linear grooves extending along a non-straight trajectory, for example, arc-shaped grooves extending along an arc trajectory. If the first groove segment 1331 and the second groove segment 1332 are linear grooves, the first groove segment 1331 and the second groove segment 1332 may be arranged at an acute angle, a right angle, or an obtuse angle. The first groove segment 1331 and the second groove segment 1332 may form a V-shape, T-shape, X-shape, or the like. In the embodiments shown in FIG. 11 and FIG. 12, the first groove segment 1331 and the second groove segment 1332 form a V-shaped structure.

The first conductive portion 52 is a part of the first conductive layer 5 located in the first groove segment 1331, and the second conductive portion 53 is a part of the first conductive layer 5 located in the second groove segment 1332. As an example, the first conductive portion 52 and the second conductive portion 53 are integrally formed, the first conductive portion 52 is fixedly connected to the side surface of the first groove segment 1331 to achieve contact between the first conductive portion 52 and the side surface of the first groove segment 1331, and the second conductive portion 53 is fixedly connected to the side surface of the second groove segment 1332 to achieve contact between the second conductive portion 53 and the side surface of the second groove segment 1332.

It should be noted that in the embodiments where the first conductive layer 5 fills the recess 132, the first conductive portion 52 fills the first groove segment 1331, and the second conductive portion 53 fills the second groove segment 1332. In the embodiments where the first conductive layer 5 is spaced apart from the bottom surface 1322 of the recess 132, the first conductive portion 52 is spaced apart from the bottom surface of the first groove segment 1331, and the second conductive portion 53 is spaced apart from the bottom surface of the second groove segment 1332.

In these embodiments, since the second groove segment 1332 is connected to the first groove segment 1331 and their extension directions intersect, the first wall portion 13 can partially flip open after the weakened portion 134 ruptures along the first groove segment 1331 and the second groove segment 1332, effectively increasing a pressure relief area of the first wall portion 13 and improving the timeliness of pressure relief during thermal runaway of the battery cell 10. The first conductive portion 52 of the first conductive layer 5 being located in the first groove segment 1331 and being in contact with the side surface of the first groove segment 1331 is conducive to eliminating a discharge tip at a connection position between the side surface of the first groove segment 1331 and the first surface 131. The second conductive portion 53 of the first conductive layer 5 being located in the second groove segment 1332 and being in contact with the side surface of the second groove segment 1332 is conducive to eliminating a discharge tip at a connection position between the side surface of the second groove segment 1332 and the first surface 131. Additionally, in the embodiments where the first conductive layer 5 is a conductive adhesive layer, the first conductive layer 5 has a minimal obstructive effect on a flipping portion of the first wall portion 13, resulting in little impact on the burst pressure of the battery cell 10.

Figure 13:
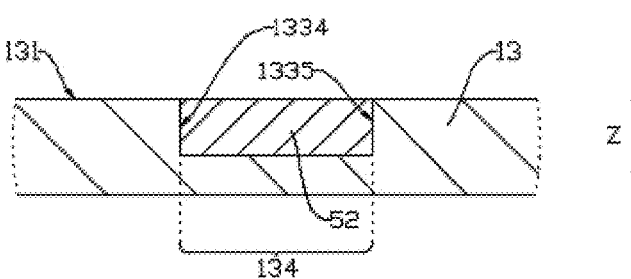
FIG. 13 is a cross-sectional view along B-B in FIG. 12.
Figure 14:
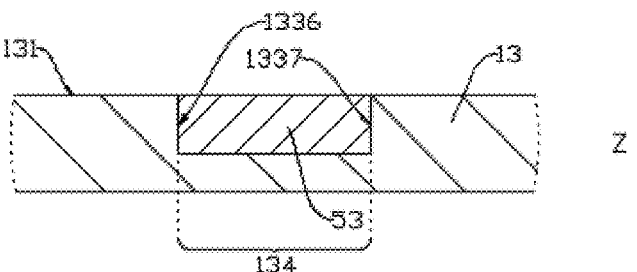
FIG. 14 is a cross-sectional view along C-C in FIG. 12.

In some embodiments, referring to FIG. 13 and FIG. 14, FIG. 13 is a cross-sectional view along B-B in FIG. 12; and FIG. 14 is a cross-sectional view along C-C in FIG. 12. Along a width direction of the first groove segment 1331, the side surface of the first groove segment 1331 includes a first side surface 1334 and a second side surface 1335 opposite each other, and both the first side surface 1334 and the second side surface 1335 are in contact with the first conductive portion 52; and/or along a width direction of the second groove segment 1332, the side surface of the second groove segment 1332 includes a third side surface 1336 and a fourth side surface 1337 opposite each other, and both the third side surface 1336 and the fourth side surface 1337 are in contact with the second conductive portion 53.

The first side surface 1334 and the second side surface 1335 are two side surfaces opposite each other along the width direction of the first groove segment 1331. The first conductive portion 52 may be fixedly connected to the first side surface 1334 and the second side surface 1335 to achieve contact between both the first side surface 1334 and the second side surface 1335 and the first conductive portion 52. The first side surface 1334 and the second side surface 1335 may be arranged parallel to each other or arranged at an acute or obtuse angle.

The third side surface 1336 and the fourth side surface 1337 are two side surfaces opposite each other along the width direction of the second groove segment 1332. The second conductive portion 53 may be fixedly connected to the third side surface 1336 and the fourth side surface 1337 to achieve contact between both the third side surface 1336 and the fourth side surface 1337 and the second conductive portion 53. The third side surface 1336 and the fourth side surface 1337 may be arranged parallel to each other or arranged at an acute or obtuse angle.

In these embodiments, both the first side surface 1334 and the second side surface 1335 being in contact with the first conductive portion 52 is conducive to eliminating a discharge tip at a connection position between the first side surface 1334 and the first surface 131 and a discharge tip at a connection position between the second side surface 1335 and the first surface 131. Both the third side surface 1336 and the fourth side surface 1337 being in contact with the second conductive portion 53 is conducive to eliminating a discharge tip at a connection position between the third side surface 1336 and the first surface 131 and a discharge tip at a connection position between the fourth side surface 1337 and the first surface 131.

Figure 15:
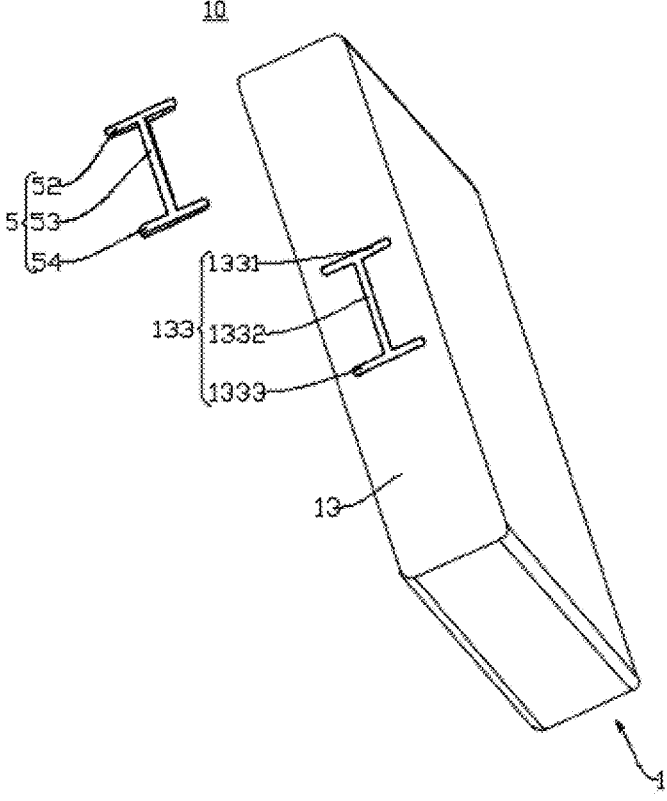
FIG. 15 is a schematic structural diagram of a battery cell according to still some other embodiments of this application (with a first conductive layer separated from a housing)
Figure 16:
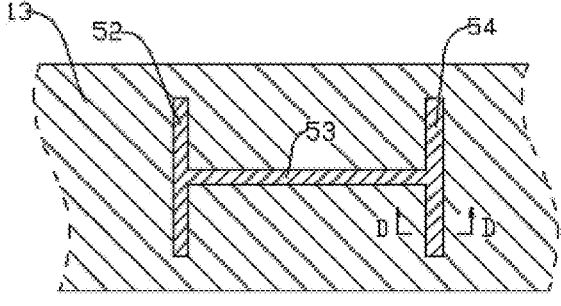
FIG. 16 is a partial view of the battery cell shown in FIG. 15.

In some embodiments, referring to FIG. 15 and FIG. 16, FIG. 15 is a schematic structural diagram of a battery cell 10 according to still some other embodiments of this application (with a first conductive layer 5 separated from a housing 1); and FIG. 16 is a partial view of the battery cell 10 shown in FIG. 15. The groove 133 further includes a third groove segment 1333, the first groove segment 1331 is opposite to the third groove segment 1333, and the second groove segment 1332 connects the first groove segment 1331 and the third groove segment 1333. The first conductive layer 5 further includes a third conductive portion 54, and the third conductive portion 54 is located in the third groove segment 1333 and is in contact with a side surface of the third groove segment 1333.

The third groove segment 1333 may be a linear groove extending along a straight trajectory or a non-linear groove extending along a non-straight trajectory. For example, the third groove segment 1333 is an arc-shaped groove extending along an arc trajectory. If the first groove segment 1331, the second groove segment 1332, and the third groove segment 1333 are all linear grooves, the first groove segment 1331 and the third groove segment 1333 may be arranged parallel to each other or arranged at an acute or obtuse angle, the first groove segment 1331 and the second groove segment 1332 may be arranged perpendicular to each other or arranged at an acute or obtuse angle, and the third groove segment 1333 and the second groove segment 1332 may be arranged perpendicular to each other or arranged at an acute or obtuse angle.

A connection position of the second groove segment 1332 and the first groove segment 1331 may be located at a middle position of the first groove segment 1331 in the extension direction or offset from the middle position of the first groove segment 1331 in the extension direction. A connection position of the second groove segment 1332 and the third groove segment 1333 may be located at a middle position of the third groove segment 1333 in the extension direction or offset from the middle position of the third groove segment 1333 in the extension direction. The first groove segment 1331, the second groove segment 1332, and the third groove segment 1333 may form various shapes such as U-shape, N-shape, and H-shape.

As an example, in FIG. 15 and FIG. 16, the first groove segment 1331, the second groove segment 1332, and the third groove segment 1333 are all linear grooves, the first groove segment 1331 is parallel to the third groove segment 1333, both the first groove segment 1331 and the third groove segment 1333 are perpendicular to the second groove segment 1332, one end of the second groove segment 1332 is connected to the middle position of the first groove segment 1331 in the extension direction, and the other end of the second groove segment 1332 is connected to the middle position of the third groove segment 1333 in the extension direction. The first groove segment 1331, the second groove segment 1332, and the third groove segment 1333 form an H-shaped structure.

The third conductive portion 54 is a part of the first conductive layer 5 located in the third groove segment 1333. The second conductive portion 53 connects the first conductive portion 52 and the third conductive portion 54. As an example, the first conductive portion 52, the second conductive portion 53, and the third conductive portion 54 are integrally formed, and the third conductive portion 54 is fixedly connected to the side surface of the third groove segment 1333 to achieve contact between the third conductive portion 54 and the side surface of the third groove segment 1333.

It should be noted that in the embodiments where the first conductive layer 5 fills the recess 132, the third conductive portion 54 fills the third groove segment 1333. In the embodiments where the first conductive layer 5 is spaced apart from the bottom surface 1322 of the recess 132, the third conductive portion 54 is spaced apart from the bottom surface of the third groove segment 1333.

In these embodiments, a region defined by the first groove segment 1331, the second groove segment 1332, and the third groove segment 1333 is larger, resulting in a larger area of a portion of the first wall portion 13 that flips open after the weakened portion 134 ruptures along the first groove segment 1331, the second groove segment 1332, and the third groove segment 1333, further increasing the pressure relief area of the first wall portion 13. The third conductive portion 54 of the first conductive layer 5 being located in the third groove segment 1333 and being in contact with the side surface of the third groove segment 1333 is conducive to eliminating a discharge tip at a connection position between the side surface of the third groove segment 1333 and the first surface 131.

Figure 17:
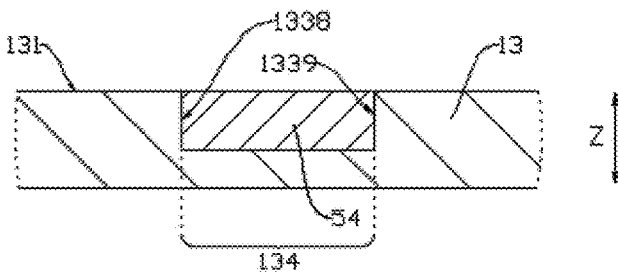
FIG. 17 is a cross-sectional view along D-D in FIG. 16.

In some embodiments, referring to FIG. 17, FIG. 17 is a cross-sectional view along D-D in FIG. 16. Along a width direction of the third groove segment 1333, the side surface of the third groove segment 1333 includes a fifth side surface 1338 and a sixth side surface 1339 opposite each other, and both the fifth side surface 1338 and the sixth side surface 1339 are in contact with the third conductive portion 54.

The fifth side surface 1338 and the sixth side surface 1339 are two side surfaces opposite each other along the width direction of the third groove segment 1333. The third conductive portion 54 may be fixedly connected to the fifth side surface 1338 and the sixth side surface 1339 to achieve contact between both the fifth side surface 1338 and the sixth side surface 1339 and the third conductive portion 54. The fifth side surface 1338 and the sixth side surface 1339 may be arranged parallel to each other or arranged at an acute or obtuse angle.

In these embodiments, both the fifth side surface 1338 and the sixth side surface 1339 being in contact with the third conductive portion 54 is conducive to eliminating a discharge tip at a connection position between the fifth side surface 1338 and the first surface 131 and a discharge tip at a connection position between the sixth side surface 1339 and the first surface 131.

Figure 18:
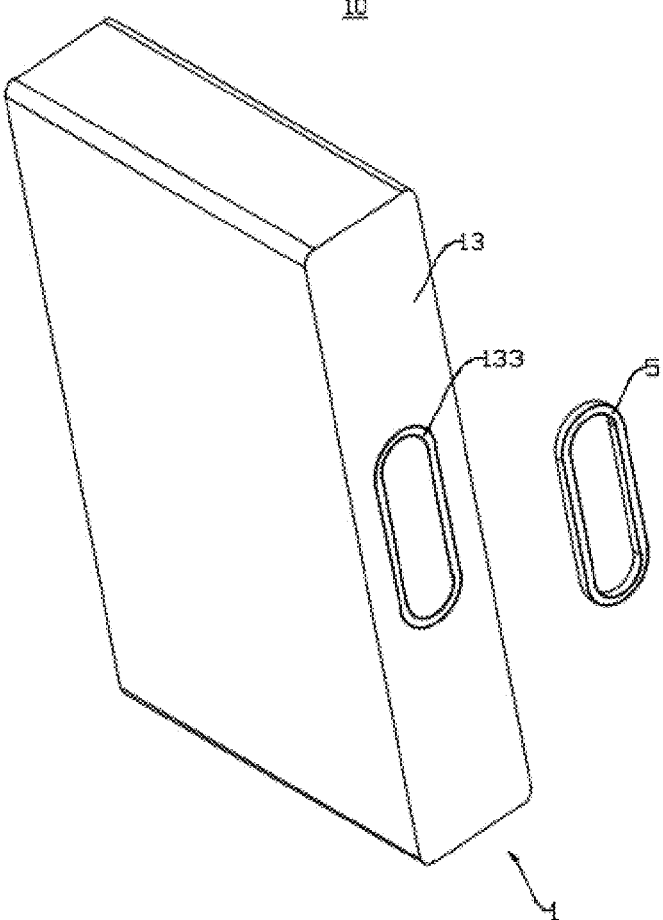
FIG. 18 is a schematic structural diagram of a battery cell according to yet some other embodiments of this application (with a first conductive layer separated from a housing)
Figure 19:
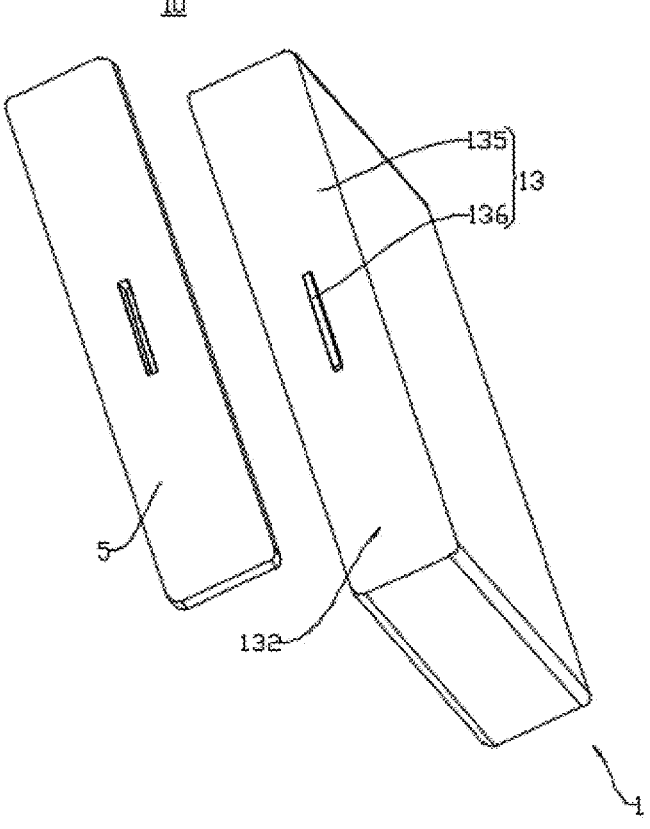
FIG. 19 is a schematic structural diagram of a battery cell according to other embodiments of this application (with a first conductive layer separated from a housing)

In some embodiments, referring to FIG. 18, FIG. 18 is a schematic structural diagram of a battery cell 10 according to yet some other embodiments of this application (with a first conductive layer 5 separated from a housing 1). The groove 133 is a groove extending along a closed trajectory.

The closed trajectory may be circular, elliptical, polygonal, or the like. The polygon may be a triangle, quadrilateral, pentagon, hexagon, or the like. A groove formed by extending along a closed trajectory is an annular groove, and it can be understood that the groove 133 is an annular groove, and the first conductive layer 5 may also be correspondingly configured to be annular.

In these embodiments, after the weakened portion 134 ruptures along an extension direction of the groove 133, a region, defined by the groove 133, of the first wall portion 13 can be entirely detached and opened. The opening of this region is less affected by the first conductive layer 5, enabling more timely pressure relief and providing a large pressure relief area.

Figure 20:
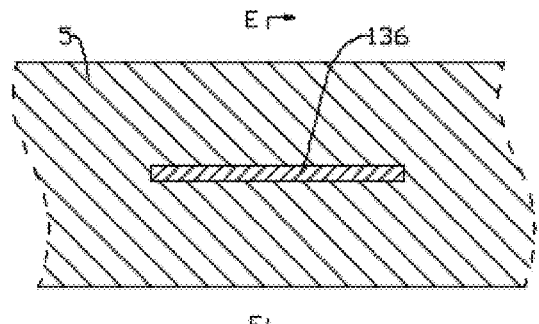
FIG. 20 is a partial view of the battery cell shown in FIG. 19.
Figure 21:
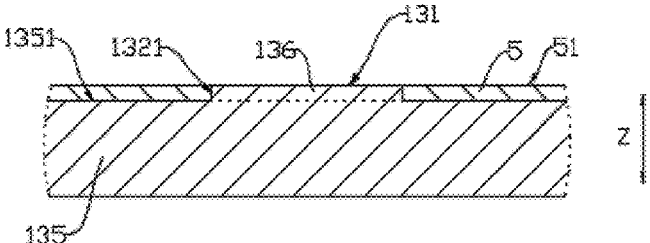
FIG. 21 is a cross-sectional view along E-E in FIG. 20.
Figure 22:
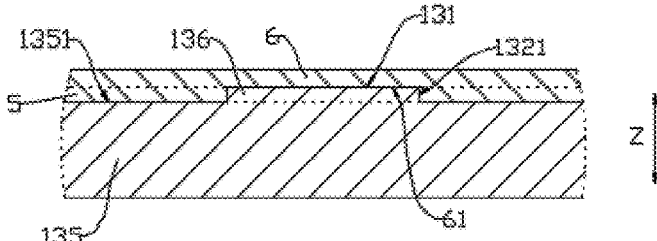
FIG. 22 is a schematic diagram of a connection of a first conductive layer, a second conductive layer, and a first wall portion according to yet still some other embodiments of this application.

In some embodiments, referring to FIG. 19 to FIG. 22, FIG. 19 is a schematic structural diagram of a battery cell 10 according to some other embodiments of this application (with a first conductive layer 5 separated from a housing 1); FIG. 20 is a partial view of the battery cell 10 shown in FIG. 19; FIG. 21 is a cross-sectional view along E-E in FIG. 20; and FIG. 22 is a schematic diagram of a connection of a first conductive layer 5, a second conductive layer 6, and a first wall portion 13 according to yet still some other embodiments of this application. The first wall portion 13 includes a wall body 135 and a protrusion 136, where the wall body 135 has a fourth surface 1351, the protrusion 136 is provided on the fourth surface 1351, an outer peripheral surface of the protrusion 136 and the fourth surface 1351 together define the recess 132, the recess 132 surrounds the protrusion 136, the outer peripheral surface of the protrusion 136 is the side surface 1321, and an end surface of an end of the protrusion 136 away from the fourth surface 1351 is the first surface 131.

The fourth surface 1351 of the wall body 135 is the bottom surface 1322 of the recess 132. After the protrusion 136 is provided on the fourth surface 1351 of the wall body 135, the first wall portion 13 forms the recess 132 in a corresponding region, not provided with the protrusion 136, of the fourth surface 1351. In the embodiments where the first conductive layer 5 fills the recess 132, the first conductive layer 5 covers the region not provided with the protrusion 136, of the fourth surface 1351.

In the embodiments shown in FIG. 21, the first conductive layer 5 has a second surface 51 farthest from the bottom surface 1322 of the recess 132 (the fourth surface 1351), and the second surface 51 is flush with the first surface 131.

In the embodiments shown in FIG. 22, the battery cell 10 includes a second conductive layer 6, where the first conductive layer 5 protrudes from a third surface 61 of the second conductive layer 6, the third surface 61 is in contact with the first surface 131 of the protrusion 136, and the second conductive layer 6 covers the recess 132. The first conductive layer 5 and the second conductive layer 6 together define a groove matching the protrusion 136, and the protrusion 136 is accommodated in the groove.

In these embodiments, an outer peripheral surface of the protrusion 136 and the fourth surface 1351 together define the recess 132. The provision of the first conductive layer 5 in the recess 132 is conducive to eliminating a discharge tip at a connection position between the outer peripheral surface of the protrusion 136 and the first surface 131.

In some embodiments, along a circumferential direction of the recess 132, the first conductive layer 5 is in contact with an entire periphery of the side surface 1321.

It can be understood that a surface of the first conductive layer 5 connected end-to-end for one circumference is in contact with the side surface 1321.

As an example, as shown in FIG. 4 to FIG. 6 and FIG. 19 to FIG. 22, as an example where the side surface 1321 is rectangular, the side surface 1321 includes four side surfaces sequentially connected end-to-end along the circumferential direction of the recess 132, and the first conductive layer 5 being in contact with the entire periphery of the side surface 1321 means that the first conductive layer 5 is in contact with all four side surfaces of the side surface 1321.

In these embodiments, the first conductive layer 5 being in contact with the entire periphery of the side surface 1321 can further reduce the risk of tip discharge at the connection position between the side surface 1321 and the first surface 131 in the high-voltage environment.

Figure 23:
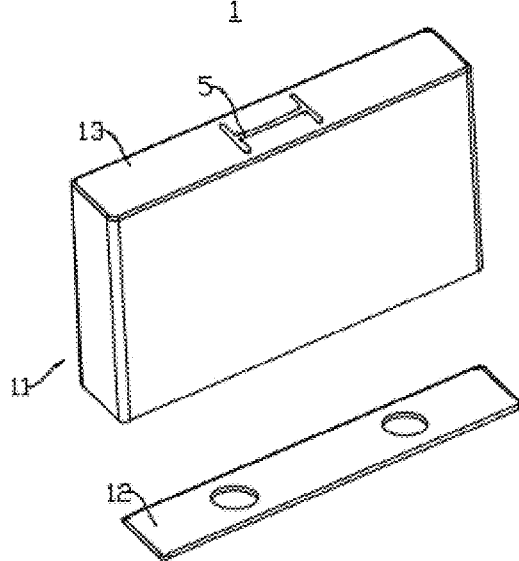
FIG. 23 is an exploded view of a housing according to some embodiments of this application.
Figure 24:
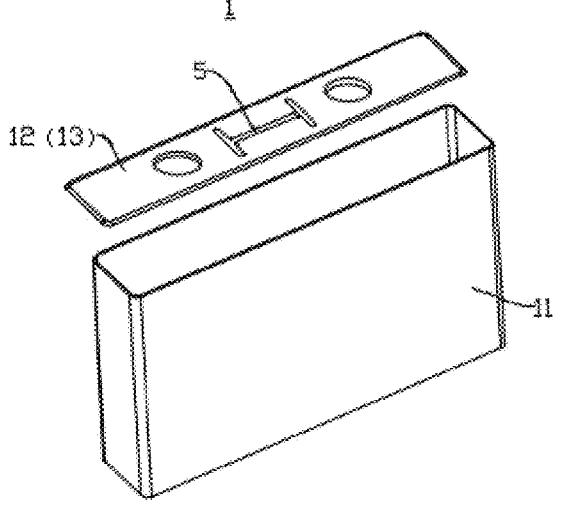
FIG. 24 is an exploded view of a housing according to some other embodiments of this application.

In some embodiments, referring to FIG. 23 and FIG. 24, FIG. 23 is an exploded view of a housing 1 according to some embodiments of this application; and FIG. 24 is an exploded view of a housing 1 according to some other embodiments of this application. The housing 1 includes a housing body 11 and an end cap 12, where the housing body 11 has an opening, the end cap 12 closes the opening 11, the end cap 12 is the first wall portion 13, and/or at least one wall portion of the housing body 11 is the first wall portion 13.

The housing 1 may be cylindrical, prismatic, or the like. As an example, in the embodiments shown in FIG. 23 and FIG. 24, the housing 1 is prismatic, specifically, the housing 1 is cuboidal.

The housing body 11 may include a plurality of wall portions, and the plurality of wall portions define an internal space of the housing body 11. If at least one wall portion of the housing body 11 is the first wall portion 13, it can be understood that one wall portion may be the first wall portion 13, or the plurality of wall portions may be the first wall portion 13. In the embodiments shown in FIG. 23, the wall portion of the housing body 11 opposite the end cap 12 is the first wall portion 13. In the embodiments shown in FIG. 24, the end cap 12 is the first wall portion 13.

Figure 25:
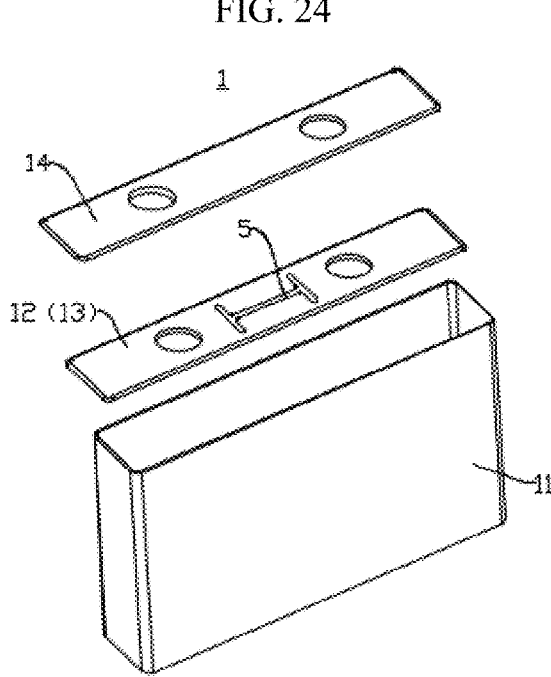
FIG. 25 is an exploded view of a housing according to still some other embodiments of this application.

In some embodiments, referring to FIG. 25, FIG. 25 is an exploded view of a housing 1 according to still some other embodiments of this application. The first wall portion 13 is provided with an insulating member 14, and the first surface 131 faces the insulating member 14.

The insulating member 14 is made of an insulating material, for example, rubber or plastic.

It should be noted that in the embodiments where the first wall portion 13 is provided with only the first conductive layer 5, the insulating member 14 may be provided on the first surface 131; and in the embodiments where the first wall portion 13 is provided with both the first conductive layer 5 and the second conductive layer 6, if the second conductive layer 6 covers the first surface 131, the insulating member 14 may be provided on the surface of the second conductive layer 6 facing away from the first surface 131.

In the embodiments where the first surface 131 faces the interior of the housing 1, the insulating member 14 is disposed on a side of the first wall portion 13 facing the electrode assembly 2, and the insulating member 14 is configured to insulate and isolate the first wall portion 13 and the electrode assembly 2. As an example where the end cap 12 is the first wall portion 13, the insulating member 14 may be a lower plastic provided on an inner side of the end cap 12.

In the embodiments where the first surface 131 faces the exterior of the housing 1, the insulating member 14 is disposed on a side of the first wall portion 13 facing away from the electrode assembly 2, and the insulating member 14 is configured to insulate and isolate the first wall portion 13 and external components. For example, at least one wall portion of the housing body 11 is the first wall portion 13, and the insulating member 14 may be an insulating film wrapped around an outer side of the housing body 11. For another example, as shown in FIG. 25, the end cap 12 is the first wall portion 13, and the insulating member 14 may be an insulating patch provided on an outer side of the end cap 12.

In these embodiments, the provision of the insulating member 14 can achieve insulation between the first wall portion 13 and other components (external components, the electrode assembly 2, and the like). Since the recess 132 of the first wall portion 13 is internally provided with the first conductive layer 5, the electric field distribution in the region of the recess 132 is improved, resulting in a more uniform electric field strength distribution, and reducing the risk of the insulating member 14 being broken down due to tip discharge and causing insulation failure.

An embodiment of this application provides a battery 100 including the battery cell 10 provided in any one of the above embodiments.

An embodiment of this application provides an electric apparatus including the battery cell 10 provided in any one of the above embodiments.

In addition, an embodiment of this application further provides a battery cell 10, where the battery cell 10 includes a housing 1 and an electrode assembly 2. The housing 1 is cuboidal, and the housing 1 includes a housing body 11 and an end cap 12, where the end cap 12 closes an opening of the housing body 11. A wall portion of the housing body 11 opposite the end cap 12 is a first wall portion 13, a surface of the first wall portion 13 facing away from the electrode assembly 2 is a first surface 131, the first wall portion 13 is provided with a groove 133, and a side surface of the groove 133 is connected to the first surface 131. A first conductive layer 5 is provided in the groove 133, the first conductive layer 5 is in contact with the side surface of the groove 133, and the first conductive layer 5 has a second surface 51 farthest from a bottom surface of the groove 133. The second surface 51 is flush with the first surface 131. The first conductive layer 5 is a conductive adhesive layer filling the groove 133.

The first wall portion 13 forms a weakened portion 134 in a region provided with the groove 133, and the weakened portion 134 is configured to be capable of rupturing to release internal pressure of the battery cell 10. The groove 133 includes a first groove segment 1331, a second groove segment 1332, and a third groove segment 1333, where the first groove segment 1331 is opposite the third groove segment 1333, the second groove segment 1332 connects the first groove segment 1331 and the third groove segment 1333, and the first groove segment 1331, the second groove segment 1332, and the third groove segment 1333 form an H-shaped structure. The first conductive layer 5 includes a first conductive portion 52, a second conductive portion 53, and a third conductive portion 54, where the first conductive portion 52, the second conductive portion 53, and the third conductive portion 54 are respectively located in the first groove segment 1331, the second groove segment 1332, and the third groove segment 1333.

It should be noted that in the absence of conflict, the embodiments and features in the embodiments of this application may be combined with each other.

The above embodiments are only used to illustrate the technical solutions of this application and are not intended to limit this application. For persons skilled in the art, various modifications and changes can be made to this application. Any modifications, equivalent replacements, and improvements made without departing from the spirit and principle of this application shall fall within the protection scope of this application.

What is claimed is:

1. A battery cell, comprising:
   a housing comprising a first wall portion, wherein the first wall portion has a first surface, the first wall portion is provided with a recess, and the recess has a side surface connected to the first surface; and
   a first conductive layer accommodated in the recess, wherein the first conductive layer is in contact with the side surface,
   wherein the recess has a bottom surface facing the first conductive layer, and the bottom surface is connected to the side surface;
   wherein the first conductive layer is spaced apart from the first surface.

2. The battery cell according to claim 1, wherein the first conductive layer extends from the first surface into the recess.

3. The battery cell according to claim 1, wherein the recess has a bottom surface facing the first conductive layer, and the bottom surface is connected to the side surface;
   wherein the first conductive layer is in contact with the bottom surface.

4. The battery cell according to claim 1, wherein the first conductive layer fills the recess.

5. The battery cell according to claim 1, wherein a maximum thickness of the first conductive layer is denoted as $H_1$, and a maximum depth of the recess is denoted as $H_2$, satisfying: $0.1 \leq H_1/H_2 \leq 1$.

6. The battery cell according to claim 5, wherein $0.4 \leq H_1/H_2 \leq 1$.

7. The battery cell according to claim 1, wherein the first conductive layer has a second surface farthest from the bottom surface of the recess, and the second surface is flush with the first surface.

8. A battery cell, comprising:
   a housing comprising a first wall portion, wherein the first wall portion has a first surface, the first wall portion is provided with a recess, and the recess has a side surface connected to the first surface; and
   a first conductive layer accommodated in the recess, wherein the first conductive layer is in contact with the side surface,
   wherein the first conductive layer is a conductive adhesive layer bonded to the first wall portion.

9. A battery cell, comprising:
   a housing comprising a first wall portion, wherein the first wall portion has a first surface, the first wall portion is provided with a recess, and the recess has a side surface connected to the first surface; and
   a first conductive layer accommodated in the recess, wherein the first conductive layer is in contact with the side surface,
   wherein the battery cell further comprises a second conductive layer, the second conductive layer has a third surface, the third surface is in contact with the first surface, the first conductive layer extends from the third surface into the recess, and the second conductive layer covers the recess.

10. The battery cell according to claim 9, wherein
    the second conductive layer covers the first surface,
    a surface of the second conductive layer facing away from the first surface is a plane,
    a maximum thickness of the first conductive layer is denoted as $H_1$, a maximum depth of the recess is denoted as $H_2$, and a maximum thickness of the second conductive layer is denoted as $H_3$, satisfying: $0.1 \leq (H_1 + H_3)/H_2 \leq 20$, wherein $1 \leq (H_1 + H_3)/H_2 \leq 5$,
    the first conductive layer and the second conductive layer are integrally formed, and/or
    the second conductive layer is a conductive adhesive layer bonded to the first wall portion.

11. A battery cell, comprising:
    a housing comprising a first wall portion, wherein the first wall portion has a first surface, the first wall portion is provided with a recess, and the recess has a side surface connected to the first surface; and
    a first conductive layer accommodated in the recess, wherein the first conductive layer is in contact with the side surface,
    wherein a conductivity of the first wall portion is denoted as $Q_1$, and a conductivity of the first conductive layer is denoted as $Q_2$, satisfying: $0.5 \leq Q_2/Q_1 \leq 1.5$.

12. The battery cell according to claim 1, wherein along a thickness direction of the first wall portion, the first surface faces an interior of the housing, or the first surface faces an exterior of the housing.

13. The battery cell according to claim 1, wherein the recess is a groove provided on the first surface, and a side surface of the groove is the side surface, wherein
    the first wall portion forms a weakened portion in a region provided with the groove, and the weakened portion is configured to be capable of rupturing to release internal pressure of the battery cell, wherein
    the side surface of the groove comprises a first side surface and a second side surface opposite each other, and both the first side surface and the second side surface are in contact with the first conductive layer;
    the groove comprises a first groove segment and a second groove segment, the second groove segment is connected to the first groove segment, and an extension direction of the second groove segment intersects an extension direction of the first groove segment; and the first conductive layer comprises a first conductive portion and a second conductive portion, the first conductive portion is located in the first groove segment and is in contact with a side surface of the first groove segment, and the second conductive portion is located in the second groove segment and is in contact with a side surface of the second groove segment.

14. The battery cell according to claim 13, wherein along a width direction of the first groove segment, the side surface of the first groove segment comprises a first side surface and a second side surface opposite each other, and both the first side surface and the second side surface are in contact with the first conductive portion; and/or along a width direction of the second groove segment, the side surface of the second groove segment comprises a third side surface and a fourth side surface opposite each other, and both the third side surface and the fourth side surface are in contact with the second conductive portion, wherein the groove further comprises a third groove segment, the first groove segment is opposite the third groove segment, and the second groove segment connects the first groove segment and the third groove segment;

the first conductive layer further comprises a third conductive portion, and the third conductive portion is located in the third groove segment and is in contact with a side surface of the third groove segment;

along a width direction of the third groove segment, the side surface of the third groove segment comprises a fifth side surface and a sixth side surface opposite each other, and both the fifth side surface and the sixth side surface are in contact with the third conductive portion; and the groove is a groove extending along a closed trajectory.

15. The battery cell according to claim 1, wherein the first wall portion comprises:

a wall body having a fourth surface;

a protrusion provided on the fourth surface, wherein an outer peripheral surface of the protrusion and the fourth surface together define the recess, the recess surrounds the protrusion, the outer peripheral surface of the protrusion is the side surface, and an end surface of an end of the protrusion away from the fourth surface is the first surface; and along a circumferential direction of the recess, the first conductive layer is in contact with an entire periphery of the side surface.

16. The battery cell according to claim 1, wherein the housing comprises:

a housing body having an opening; and an end cap closing the opening;

wherein the end cap is the first wall portion, and/or at least one wall portion of the housing body is the first wall portion.

17. The battery cell according to claim 1, wherein the first wall portion is provided with an insulating member, and the first surface faces the insulating member, wherein the battery cell further comprises an electrode assembly, and the electrode assembly is accommodated in the housing; and the first surface faces an interior of the housing, and the insulating member is disposed on a side of the first wall portion facing the electrode assembly; or the first surface faces an exterior of the housing, and the insulating member is disposed on a side of the first wall portion facing away from the electrode assembly.

18. A battery, comprising the battery cell according to claim 1.

19. An electric apparatus, comprising the battery cell according to claim 1.

\* \* \* \* \*